United States Patent
Tsao et al.

(10) Patent No.: US 7,574,202 B1
(45) Date of Patent: Aug. 11, 2009

(54) SYSTEM AND METHODS FOR A SECURE AND SEGREGATED COMPUTER NETWORK

(75) Inventors: Robert Tsao, San Mateo, CA (US); David G. Thirlwall, San Mateo, CA (US); Graham N. Gillies, San Francisco, CA (US); Keith C. Redfield, San Jose, CA (US); Grant D. Speakman, Downers Grove, IL (US)

(73) Assignee: AirSurf Wireless Inc., San Mateo, CA (US)

( * ) Notice: Subject to any disclaimer, the term of this patent is extended or adjusted under 35 U.S.C. 154(b) by 557 days.

(21) Appl. No.: 11/459,191

(22) Filed: Jul. 21, 2006

(51) Int. Cl.
*H04M 1/66* (2006.01)
*H04M 1/68* (2006.01)
*H04M 3/16* (2006.01)
*H04Q 7/00* (2006.01)

(52) U.S. Cl. ............... 455/411; 455/422.1; 455/435.2; 455/525; 455/410; 370/338; 370/328; 370/310.2; 370/310

(58) Field of Classification Search ........... 455/411, 455/410, 517, 525, 435.2, 422.1, 403; 370/328, 370/338, 310.2, 310, 331
See application file for complete search history.

(56) References Cited

U.S. PATENT DOCUMENTS

| | | | |
|---|---|---|---|
| 7,388,844 B1 * | 6/2008 | Brown et al. | 370/252 |
| 2004/0266427 A1 * | 12/2004 | Kurokawa | 455/426.2 |
| 2005/0013262 A1 * | 1/2005 | Zein Al-Abedeen et al. | 370/316 |
| 2005/0066061 A1 * | 3/2005 | Graves et al. | 709/249 |

* cited by examiner

*Primary Examiner*—Huy Q Phan
(74) *Attorney, Agent, or Firm*—Kang S. Lim

(57) ABSTRACT

The present invention is a method and system for managing a secure local area network wherein the local area network includes a plurality of private networks logically linked to a wireless network having a plurality of wireless access points for isolating data traffic. The system provides authentication of the user devices, segregation of the user device into logical wireless virtual local area networks (WVLANs), and places the private networks into virtual local area networks (VLANs). By linking WVLANs with the appropriate VLANs, the management system provides segregation of user device traffic, as well as private network traffic, despite a shared physical network. By consolidating wireless networks in a multi-tenant environment, the work area of each individual tenant is expanded to a building wide roaming area, and radio frequency interference is reduced. In addition, by coupling together numerous wireless networks a greater roaming capability is created across all managed wireless networks.

20 Claims, 37 Drawing Sheets

SYSTEM AND METHODS FOR A SECURE AND SEGREGATED COMPUTER NETWORK

BACKGROUND OF THE INVENTION

This invention relates generally to wireless LAN (Local Area Network) system and method to provide wireless networking data services in corporate environments. More particularly, the present invention relates to a method for a secure and segregated wireless LANs, e.g. an 802.11 wireless network, for distinct groups of mobile users eliminating the need for multiple distinct WLANs in dense multi-tenant locations.

Wireless networks offer a number of advantages over traditional wired networks. Difficulties and cost of wiring category 5 cable, associated with typical ethernet networks, are eliminated when using a wireless network. Wireless networks are much easier to relocate or rearrange since the hardware is not permanently integrated into the building structure. Additionally, and most importantly, wireless networks allow the ability to mobilize users, which is an ever increasing need as laptop computing and PDA use becomes more pervasive. These practical benefits make wireless networks an ever increasingly attractive option for many businesses and organizations.

However, wireless networks are not without some inherent drawbacks when compared to wired networks. Due to the lack of physical wires, and the broadcasting of information via radio frequencies (RF), a wireless system is more susceptible to security risks, hostile attacks, and user misuse, which may jeopardize critical information and network functionality. Additionally, most jurisdictions have only a limited number of frequencies legally available for use by wireless networks. Ideally, adjacent wireless access points use different frequencies to communicate with their clients in order to avoid interference between the two systems. Moreover, wireless devices can detect data traffic on other frequencies, and rapidly switch from one frequency to another to achieve better reception. However, the limited number of frequencies becomes problematic in areas dense in wireless networks, such as a multi-tenant commercial building or metropolitan areas, because there is not enough physical space available between multiple WLAN deployments to avoid interference. Additionally, many non-802.11 devices operate using the 2.4 GHz frequency, such as wireless phones, creating additional interference and markedly reduce the perceived signal strength of a wireless access point.

Currently, in a commercial setting, wireless networks are established by each company separately to ensure the exclusivity of traffic on the network and to provide the level of control required to ensure adequate security and flexibility. These wireless networks utilize one or more wireless access points (AP) and are typically coupled to a wired network that then allows access to the company's local area network (LAN). While providing a limited degree of mobility for employees, these systems restrict wireless access to locations where the company has deployed access points and coupled them to the wired network. Additionally, security of transmitted data is still a concern even when security protocols, such as WEP (Wired Equivalent Privacy), are utilized.

Service provider solutions in these environments are generally able to offer greater mobility because they are allowed to deploy access points in a larger coverage area than any one company can. However, these public "hotspot" solutions are insecure because they couple users from all companies to one public network and cannot segment users into groups based on company or identity. These hotspots also do not provide access to the same resources as self-deployed WLANs because they are designed to couple end users to an Internet gateway for access to the world wide web. This requires companies to open their corporate networks to the Internet with a virtual private network (VPN) in order to give their wireless users access to private network resources.

However, while VPN may provide security to the company LAN and roaming ability, the user devise is exposed to an insecure environment and may be compromised. Most companies are extremely concerned with the confidential information typically found on employee laptops.

For the typical company, the above systems are still too insecure, without providing the level of user mobility or access to resources desired. Companies, particularly those in a dense network location, such as a multi-tenant environment or metropolitan area that want wireless networks must continue to deploy their own access points creating more noise and interference for themselves and their neighbors.

It is therefore apparent that an urgent need exists for an improved wide area, publicly accessible wireless LAN that is secure, keeps users segregated into private logical groups, couples end users directly to their corporate network resources without a VPN, and reduces radio frequency interference and allows for extensive roaming by users. This solution would be able to provide the same functionality as self-deployed corporate WLANs, relieving the need of companies to deploy their own access points, thereby reducing interference without sacrificing security, mobility or functionality.

SUMMARY OF THE INVENTION

To achieve the foregoing and in accordance with the present invention, a method and system for managing a secure local area network wherein the local area network includes a plurality of private networks logically linked to a wireless network having a plurality of wireless access points for isolating data traffic is provided. Such a wireless system is useful for a landlord to provide secure, segregated and roaming capable wireless access to tenants and guests.

The wireless network is deployed in the desired coverage area, typically in commercial multi-tenant building(s). The wireless network replaces and consolidates existing tenant wireless networks.

At least one wireless local area network switch and at least one authentication server authenticate a plurality of wireless user devices. The authentication of the plurality of wireless user devices is performed against a wireless local area network switch including wireless user device credentials, a local database including wireless user device credentials and a roamer database including wireless user device credentials, thereby allowing for extensive authenticated wireless user device mobility and authenticated wireless user device roaming capability.

The at least one wireless local area network switch then segregates the authenticated wireless user devices logical wireless virtual local area networks (WVLANs) according to access policies of each user device. These access policies may be configured.

Each authenticated user devices are then assigned to at least one wireless access point of the plurality of wireless access points based upon the proximity of each user device to the access point. The Access points then allow the user devices to couple to the wireless network. As the user device is repositioned, new access points may be assigned to the user devices allowing for the user devices to move around the wireless network without any break in connectivity or drop in performance.

The at least one wireless local area network switch also segregates the plurality of private networks into a corresponding plurality of logical private virtual local area networks (VLANs) in a one to one fashion. The WVLANs and VLANs are then linked according to access policies, which are configurable. This linking enables the authenticated wireless user devices to couple to at least one of the private networks. Additionally, traffic between one logical WVLAN and the linked private VLAN is isolated from traffic between the any other logical WVLAN and its linked private VLAN.

There may be two or more wireless networks which may enable communication between a user device and a private network from multiple geographic locations, significantly extending roaming capability. Similarly, there may be two or more private networks enabling connectivity of a private LAN to the wireless network(s) in multiple geographic locations.

One advantage of the present invention is that by consolidating all of the wireless networks within the building into a single managed wireless network, the user gains the ability to move seamlessly within the building's coverage area thereby increasing the work place to the entire building. Moreover, with the inclusion of multiple wireless coverage areas, the ability for user mobility expands to any managed wireless network, thereby creating a metro-area roaming capability. This consolidation of wireless networks eliminates many sources of interference thus improving wireless performance. Additionally, with the segregation of the user devices into WVLANs, the physical network may be shared without the sharing of private data traffic.

These and other features of the present invention will be described in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
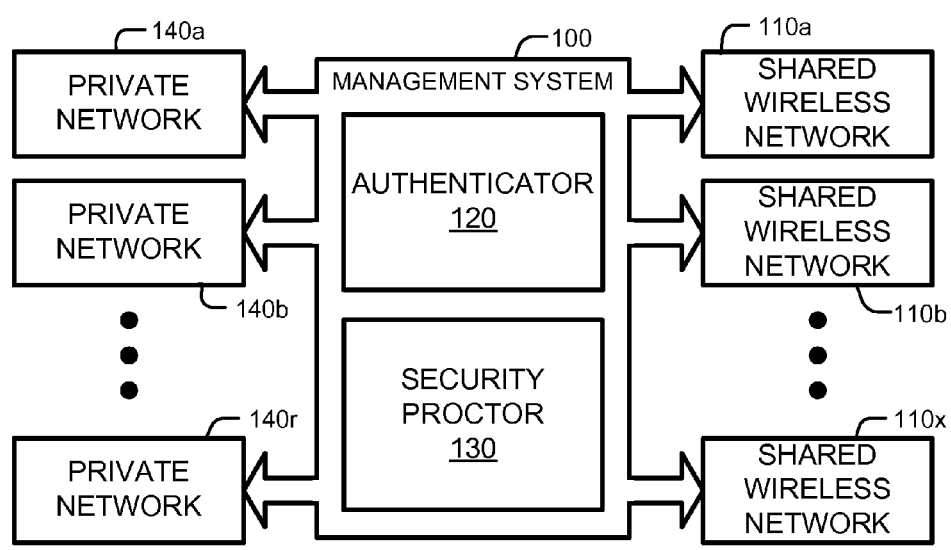
FIG. 1 shows a logical block diagram of a short range, secure wireless system in accordance with an embodiment of the present invention.

To facilitate discussion, FIG. 1 shows a logical block diagram of a short range, secure wireless system in accordance with an embodiment of the present invention. A Management System 100 provides connectivity between one or more Private Networks 140 and one or more Wireless Network 110. The Management System 100 combines Authenticator ability 120, with the Security Proctor 130 required to maintain a secure environment. In some embodiment, the Management System 100 allows for authentication and connectivity between any of the Wireless Networks 110 and any of the Private Networks 140, providing for extensive roaming capability with the ability to get access to wired resources in a secure manner.

In some embodiment, Wireless Networks 110 follow 802.11 standards. Each Wireless Network 110 is a single location network, ideally occupying a building wide wireless network. Alternatively, the Wireless Network 110 can encompass part or all of a building, campus or open space. Each Wireless Network 110 provides seamless coverage over the entire covered area. Mobile user devices couple to the Wireless Network 110 in a secure and private connection. In some embodiment, all wireless traffic on the Wireless Network 110 is encrypted with WPA (Wi-Fi Protected Access) standards (TKIP/AES). Other acceptable encryption techniques such as dynamic 128-bit WLP keys rotating every 30 minutes may also be utilized, as is well known by those skilled in the art. All wireless traffic is monitored to ensure that it is encrypted.

In one embodiment, all tenants and the landlord adopt an "RF (Radio Frequency) Lockdown" policy that blocks associations to unknown Wi-Fi devices within the coverage area. A list of all authorized devices (the Authorized List) and allowable associations (the Allowed List) is created. Within the coverage area, an attempt to terminate all associations not on the Allowed List or to a device not on the Authorized List is made. The policy can also provide a specific process for adding devices to the Authorized List and associations to the Allowed List.

Wireless Networks 110 are deployed by creation of a radio frequency map of the desired coverage area. The creation of such a RF map requires a radio frequency site survey. In some embodiment, Access Points (AP) 311 are placed in multiple locations in the site, and signal to noise ratio (SNR) readings and data throughput speeds are taken to determine the coverage area of the AP. Three types of signal readings are taken of each access point. The first is the signal strength of a laptop computer as heard by the AP. Optimally, multiple readings are taken to ensure accuracy. The second signal reading is the relative signal strength index (RSSI) of the access point as heard by the laptop as it moved away from the AP. The third reading is data throughput speeds from and to the laptop computer. Together these survey readings are plotted on a map of the building and compared to specific SNR and throughput thresholds to determine the appropriate shape of the coverage area of an access point at specific locations throughout the building. Examples of RF mapping tools include software from vendors such as Ekahau, Trapeze Networks, NetStumbler, AirMagnet, AirDefense, and WildPackets. Other acceptable systems for RF map generation may be utilized, as is well known to those skilled in the art. The RF mapping determines the number of access points required in a building as well as each access point's location, signal strength, and channel configuration allowing for complete coverage, adequate signal strength, and detection of interference sources.

Prior to Wireless Network 110 deployment, a review is made of the existing wireless devices in the building, with the customer and landlord, to determine which devices belong to which tenant. Any rogue access points may be identified and removed. If any existing interference issues are detected, they can be resolved prior to deployment.

As with the wireless networks 110, each Private Network 140 is a single location, ideally occupying a building wide wired network. Alternatively, the Private Network 140 can encompass part or all of a building, campus or open space. Wireless Networks 110 and Private Networks 140 are ideally located in the same locations; however the embodied invention is not limited to situations where the wired and Wireless Networks 110 are coextensive, and may be separated as location or client needs dictate.

In some embodiment, all network equipment is deployed in a secure location, preferably in a rack located in locked data closet only accessible with landlord permission. Access points may be securely mounted on walls and ceiling tiles. All devices are monitored from the NOC (Network Operations Center). Should any device fail or be removed, the customer and/or landlord may be notified of any potential security threat and an attempt may be made to resolve such an issue when it occurs.

Network connection of wireless backbone and wired networks are made through 10/100/1000 Megabit/sec Ethernet cable, although other network wiring technologies, such as high speed optical cable, may also be used. Wireless mesh networks may also be used to couple wired networks, network devices, or access points, as is well known by those skilled in the art.

The Security Proctor 130 portion of the management system provides for secure Wireless Networks 110. The Security Proctor 130 includes a network environment monitor for monitoring logical information along with radio frequency (RF) observations, a threat detector for identifying security threats from the information monitored and a regulator for instating changes to the network to minimize security risks. In addition, the Security Proctor 130 monitors and logs the performance, connection quality and activity of all wireless devices in the Wireless Networks 110.

The Authenticator 120 operates to authenticate coupling user devices by user name and password in conjunction with MAC (Media Access Control) address or certificate information. In some embodiment, user devices are re-authenticated every hour, however this rate of recurrence may be altered as security concerns dictate. The Authenticator 120 applies additional access policies to coupling user devices such as times of allowable access, dates of allowable connection, which access points the device is allowed to couple to, which corporate LAN (Local Area Network), as well as which wireless virtual local area network (WVLAN) the device is assigned to.

Figure 2:
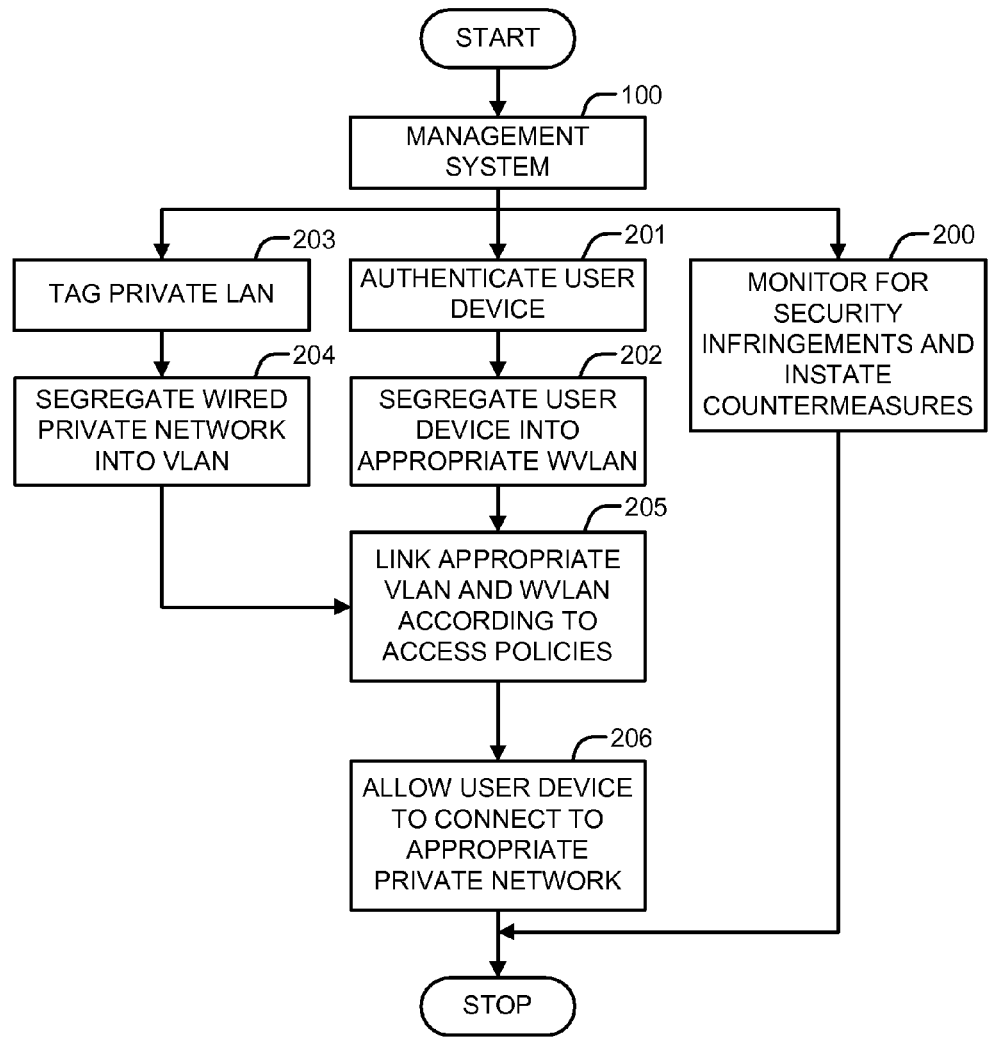
FIG. 2 shows a flow chart illustrating the process for the management system for the wireless system of FIG. 1.

FIG. 2 shows a flow chart illustrating the process for the Management System 100 for the wireless system of FIG. 1. Traffic coming through the Access Ports 342 from Private Network 140 is coupled directly into a unique port of a PoE VLAN Switch 313. PoE VLAN Switch 313 assigns an 802.1q tag to the incoming traffic according to policies developed by the management. In this process the Management System 100 tags Private Networks 140, in step 203, according to the Access Port 342 that each Private LAN is coupled to. Management System 100 then creates a Virtual Local Area Network (VLAN) for each wired private networks in step 204. Each Private VLAN's traffic is tagged with a unique 802.1q number, thereby separating it from all other Private's VLAN traffic to preserve confidentiality of all Private LANs. The PoE VLAN Switch 313 forward traffic to other PoE VLAN Switch ports in the building with the same tag number as well as to the WLAN Switch 315.

User Devices 311 are authenticated through the WLAN Switch 315 against the RADIUS Server 320 in step 201. The WLAN Switch 315 is preconfigured with a plurality of distinct WVLANs where traffic from each WLVAN is separated from each other. Upon successful authentication, WLAN Switch 315 then places each User Device 311 into an appropriate Wireless Virtual Local Area Network (WVLAN), in step 201, according to access policies developed by the management and configured in the RADIUS Server 320. Each WVLAN's traffic is separate from all other WVLAN traffic to preserve confidentiality of User Devices 311.

In step 205, the appropriate VLAN is linked with the correct WVLAN according to access policies developed by the management. This is done by assigning the WVLAN the same 802.1q tag number that its corresponding VLAN was assigned. The tagged traffic from User Device 311 is forwarded to the PoE/VLAN Switch 313 which in turn forwards it to the Access Port 342. Access policies and 802.1q tag assignments are dynamic and configurable, thus allowing for flexible access by User Devices 311 and changes in the event of user termination, guests, new employees, Private Network 140 modifications, or any other account changes. This also enables the connectivity of multiple wireless VLANs and WLVANs within and between buildings.

In step 206, User Devices 311 are allowed to couple to the appropriate private LAN, but no other private LAN. Therefore, in some embodiment, a wireless user device is only able to communicate with the other wireless users on their WVLAN or the wired Private Network 140 that is coupled to that WVLAN, but not to any other device or wired Private Network 140. The advantage is the enablement of sharing of Access Points 312, and resulting roaming capability, without the risk of information sharing.

In one embodiment access policies dictate connectivity of User Devices 311 to the appropriate WVLAN and the connectivity between VLAN and WVLAN. When a customer subscribes to the service, a valid user account is created for that user and the User Device 311 of that account is assigned to a WVLAN within the Wireless Network 110. Customers can create an unlimited number of user accounts and an unlimited number of VLANs. Each user account can only be assigned to one VLAN. Only one wireless User Device 311 is valid for use for each user account. Each customer may have a pre-approved customer account administrator. The creation of new user accounts and all changes to existing accounts are approved by the appropriate account administrator. Changes include, but are not limited to the creation or termination of WVLANs, the addition or termination of Private Network 140 VLANs, and addition or termination of user accounts. This can be done through a web-based interface of the Authentication Server that allows for selective administrative rights of specific users.

In step 200, Management System 100 also functions to actively monitor for security infringements and instate countermeasures for security concerns for the entire wireless system, resulting in unparalleled security of the wireless system.

Figure 3A:
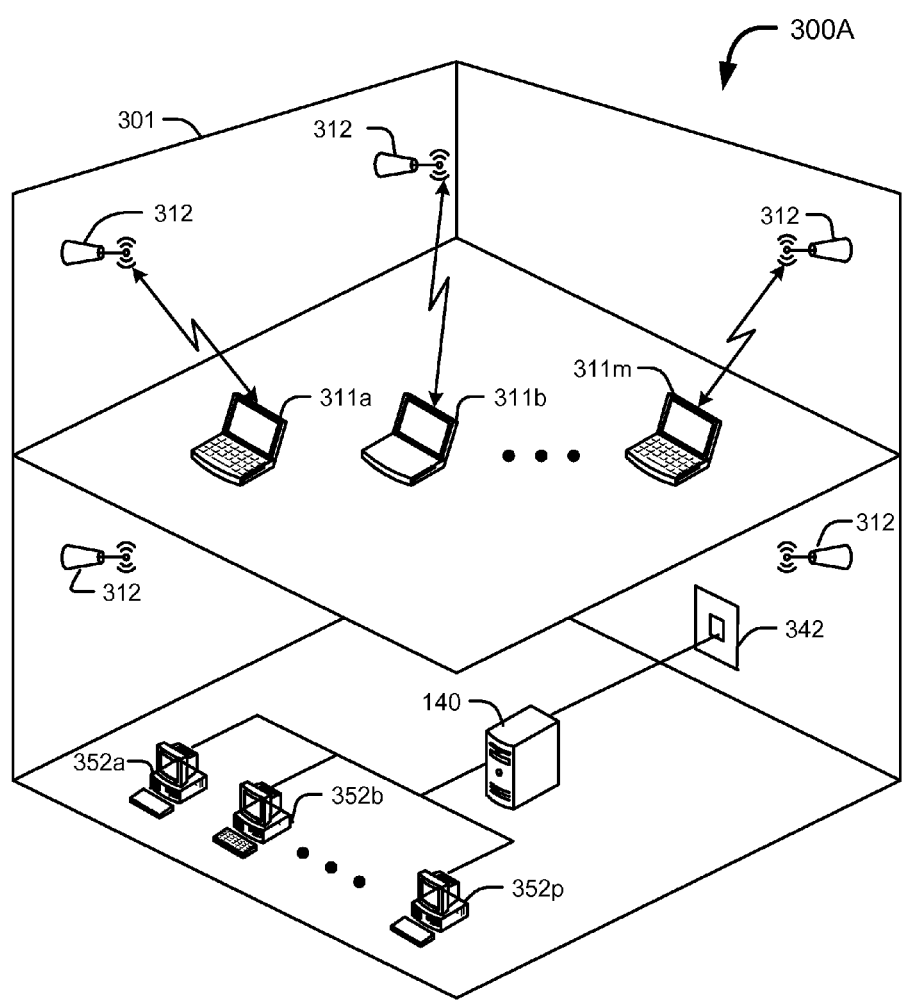
FIG. 3A shows an illustration of a typical layout in a building for deployment of components for the wireless system of FIG. 1.

FIG. 3A shows an illustration of a typical layout in a building for deployment of components in accordance with an embodiment of the present invention. In this illustration Coverage Area 301 may be a multi story building. Access Points 312 are mounted in the building as to provide wireless connectivity to all Wireless User Devices 311.

Private Network 140 couples to the Access Port 342. Computers 352 couples to the Private Network 140, providing connectivity between the Wireless User Devices 311 and the private wired resources.

In this embodiment, wireless and Private Networks 140 are transparent. In some embodiment, the wireless and Private Network 140 may be separated. Additionally only one Private Network 140 is illustrated for simplicity reasons, however in some environment there may be one or more Private Networks 140.

Figure 3B:
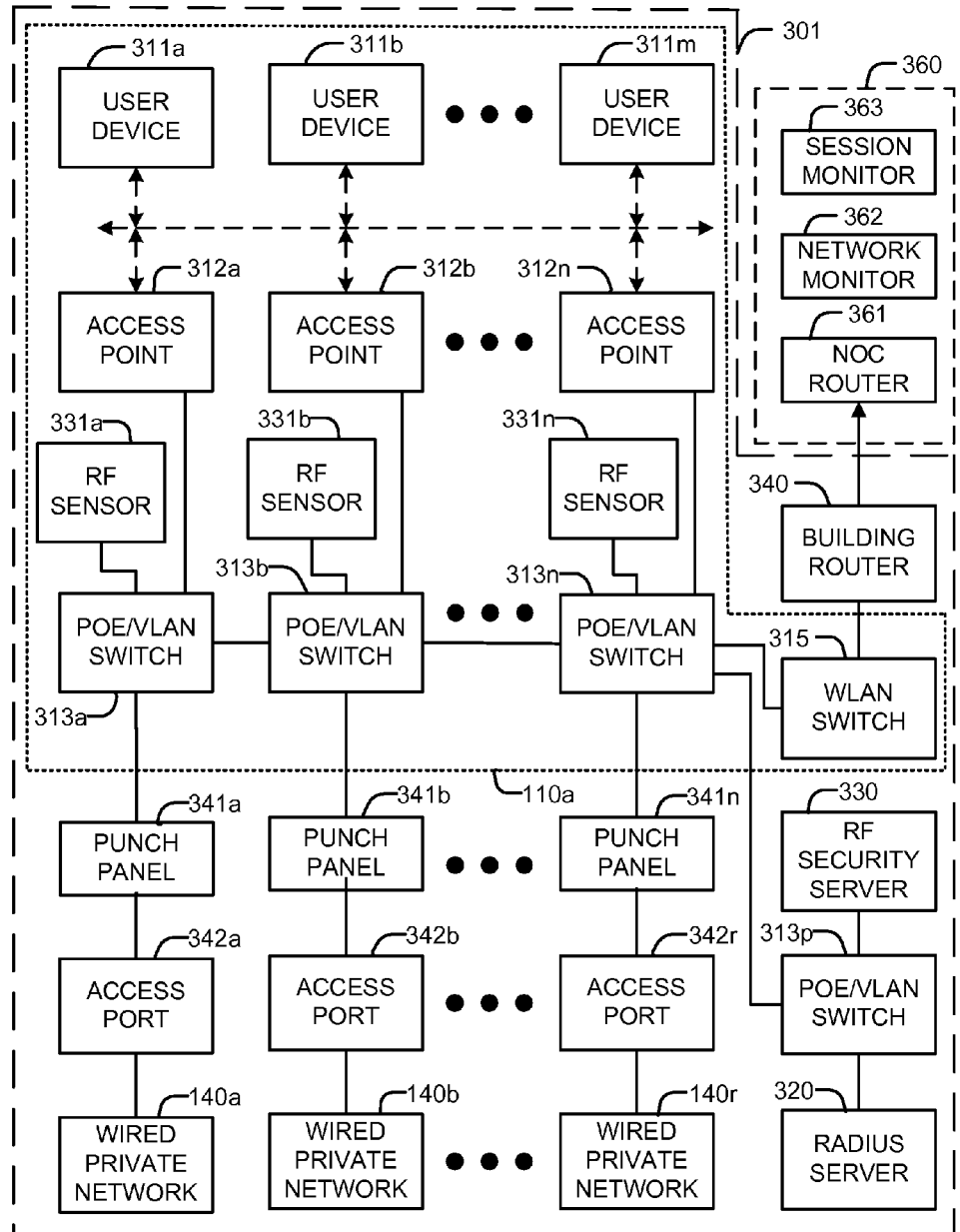
FIG. 3B shows a functional block diagram of a wireless system physical layout for the wireless system of FIG. 1.

FIG. 3B shows a functional block diagram of a wireless system physical layout in accordance with an embodiment of the present invention. Diagram 300B encompasses a single coextensive wireless network and wired network. Coverage Area 301, in one embodiment, is a multi tenant environment. Examples of the Coverage Area 301 include, but are not limited to, multi tenant buildings, campus locations and open spaces. Each Coverage Area 301 may have one or more local security contacts (building engineer and/or tenant IT contact) who are the recipients of security alerts and maintenance notifications. The wireless network extends throughout the entirety of Coverage Area 301.

Wireless User Devices 311 are authorized user devices located within the Coverage Area 301 of the wireless network. An unlimited number of User Devices 311 may coexist in the wireless network at one time. User Devices 311 typically are Wi-Fi enabled laptop computers, however User Devices 311 are not limited to laptop computers and a range of devices, such as wireless PDAs and IP telephones, that are Wi-Fi compatible, may be a User Device 311.

In plural embodiments, customers standardize on one wireless software client utility for use on all mobile user devices 311. Current recommendation is that all laptops upgrade to the Windows XP operating systems with the latest service pack upgrades, and use the Windows wireless client utility to manage the wireless devices, however this is not the only client software available and any appropriate client may be utilized. User Devices 311 should not couple to networks or access points not on the Authorized List 521 or Allowed List 520. By default, many wireless software client utilities are configured to couple to the strongest wireless signal detected even though it may not be an allowed association. This setting should be turned off. An appropriate wireless software client has the ability to so. User Devices 311 should not share their Internet connection with others on the network. Some wireless software client utilities are configured to allow others devices to share another device's Internet connection by default. This setting should be turned off as well. User Devices 311 should turn off their wireless device before physically coupling to the Private Network 140 with an Ethernet cable. Additionally, customers should perform periodic User Device 311 configuration audits to verify compliance.

Wireless User Devices 311 couple to Enterprise Access Points (EAP or AP) 312. Examples of such devices include the Trapeze Mobility Point or the Cisco Aironet Access Point. There is no limit to the number of User Devices 311 coupled to any of the Access Points 312 beyond the physical bandwidth limitations of the Access Points 312 themselves. Additionally, authorized User Device 311 may couple to any and all of the available Access Points 312. In some embodiment, User Device 311 connectivity may be limited to a particular time of day, particular dates, connection to particular Access Points 312, and connectivity to particular wired resources, based upon the access policies desired. Additional User Device 311 limitations may be implemented as need dictates. Enterprise Wireless Access Points 312 are distributed throughout the Coverage Area 301. The placement of the wireless Access Points 312 requires that the AP signals overlap throughout the Coverage Area 301 in order to ensure seamless wireless mobility. This feature allows the expansion of a tenant work area to be extended throughout the entire Coverage Area 301, thus permitting a high degree of mobility and user roaming.

The placement of the Access Points 312 is determined by RF mapping, expected user demands and accessibility concerns. During RF mapping other wireless devices and sources of radio frequency are identified and resolved. The typical range of an Access Point 312 extends for a 300 foot radius; however this distance may vary greatly depending on building conditions, weather, AP location, other nearby electronic devices and obstructions.

With the consolidation of wireless networks in the Coverage Area 301 there is an optimization between the coverage by the Access Points 312 and the level of interference. A typical multi tenant environment, with individual wireless networks, usually creates an over abundance of access points. This over abundance of access points results in excessive radio frequency traffic, radio frequency interference, and resulting decline in wireless network performance. When a single shared Wireless Network 110 is established, all individual wireless networks are eliminated, reducing Access Points 312 to the minimum number required for complete coverage. In this way, radio frequency interference is dramatically reduced, and Wireless Network 110 performance is optimized.

Access Points 312 are coupled to a Power over Ethernet (PoE)/Virtual Local Area Network (VLAN) Switch 313. An example of such a device is the 16-Port 10/100 Mbps Web Smart PoE Switch by TRENDnet model TPE-S88. One or more Access Points 312 may be coupled to each PoE/VLAN Switch 313. In some embodiment, Access Points 312 and PoE/VLAN Switches 313 are coupled with category 5 Ethernet cable. PoE/VLAN Switches 313 are coupled together by category 5 Ethernet cable as well. The primary purpose of PoE/VLAN Switches 313 is to provide power to the Access Points 312 and to supply connectivity to the WLAN (Wireless Local Area Network) Switch 315. Access Point 312 configurations are managed by the WLAN Switch 315 that it is coupled through as configured through the PoE/VLAN Switch 313 network in the building. To provide seamless roaming, all Access Points 312 are provisioned with the same SSID so that User Devices 311 can couple automatically to the Access Point 312 with the strongest broadcast signal as it roams throughout the building. In noisy environments, each Access Point 312 is given a unique SSID to eliminate excessive Access Point 312 hopping when at a static location. Access Points 312 are given both a generic SSID and a unique SSID to allow end users to choose the preferred usage method (static or roaming). The Access Points 312 are also configured to broadcast WPA authentication and require 802.1x authentication when new devices attempt to associate. PoE/VLAN Switches 313 have a physical limitation of 300 feet from the Access Points 312 it is supplying power to.

WLAN Switch 315 provides power to and configuration for the Access Points 312. An example of a WLAN Switch 315 is the Trapeze Mobility Exchange (MX) WLAN Switch 315. WLAN Switch 315 may be coupled to the PoE/VLAN Switches 313 by category 5 Ethernet cable. WLAN Switch 315 provides assignment of User Devices 311 to its appropriate VLAN through authenticating through the RADIUS (Remote Authentication Dial-In User Service) Server 320. In addition to Access Point 312 configurations, each WLAN Switch 315 is pre-configured with up to 4096 wireless VLANs, each with a unique text-based VLAN name and 802.1q tag number and port assignment. The WLAN Switch 315 is also configured with the IP addresses of RADIUS servers 320 and the priority of how to authenticate end users against them. The priority of RADIUS servers 320 is first internal, then the RADIUS Server 320 located in the building, and finally against a RADIUS Server 320 in the NOC. The multiple servers provide for maximum authentication performance as well as redundancy should any server fail or become unreachable. When a User Device 311 authenticates against the appropriate RADIUS Server 320, it requests the appropriate credentials to validate the identity of the user (MAC address, username, password, certificate). Once the identity of the user has been established, any access policies attached to that user are applied. If the user passes the access policies, the WVLAN name that the end user is assigned to is returned to the WLAN switch 315, which then assigns the User Device 311. The WLAN Switch 315 also enforce certain access policies not managed by the RADIUS Server 320 such as traffic priority level or the denial of connections based on which Access Point 312 the User Device 311 is attempting to couple to. The WLAN Switch 315 is also configured to couple to other WLAN Switches 315 in other locations to pass along the traffic from users that need to couple to a WVLAN configured on other WLAN Switches 315. The assignment of User Devices to VLANs allows for a separation of User Devices 311 by distinct logical groups. VLAN groups are typically separated by tenant, or tenant subsection, such as guests to a tenant. Segregation of User Devices 311 ensures privacy of wireless traffic and information.

RADIUS Server 320 may be coupled to PoE/VLAN Switches 313 by category 5 Ethernet cable. The RADIUS Server 320 functions to authenticate User Devices 311 through the WLAN Switch 315. In some embodiment, RADIUS Server 320 utilizes 802.1X using PEAP/MS-CHAP v2 protocol for User Device 311 authentication, requiring a username and password to be supplied by the User Device 311, but can also authenticate with certificates loaded on the User Device 311 using the EAP-TLS standard. RADIUS Server 320 collects logical information on User Devices 311, including the number of failed authentication attempts, the user name, password, MAC address and credentials of the User Device 311. Information from the RADIUS Server 320 is used to populate the Security Database 510 and the Usage Database 530. RADIUS Servers 320 authenticate against user databases that may be LDAP compliant, such as Microsoft Active Directory. Active Directory servers may be set up in regional domains where all domain servers in a domain contain all the user records in that domain and automatically replicate between themselves. A typical domain can represent a metropolitan service area. In one embodiment, each customer/tenant/business is entered into the directory under a domain as an Organizational Unit (whose name is the customer account number). A business is assigned one or multiple WVLANs, which are configured as a Global Group underneath the Organizational Unit. The name of the Global Group corresponds to the unique textual name of the WVLAN, which is configured in the WLAN switch. As end user accounts are created, they are assigned to a WVLAN by being configured as users with a membership to the appropriate Global Group. The user account in Active Directory is able to store the username, password, and MAC address used to authenticate the user by the RADIUS Server 320. The directory is also able to enforce other access policies such as access by time of day, dates, and the IP address of the requesting WLAN Switch 315. All users that are members of a Global Group are assigned to the same WVLAN by assigning them to a vendor-specific RADIUS policy that returns the name of the correct WVLAN to the authenticating WLAN Switch 315 after successful authentication. All authentication domains are part of a global domain so that users from one domain are able to authenticate against a RADIUS server from another domain.

Radio Frequency Sensors 331 couple to the PoE/VLAN Switches 313. Examples of such a device are AirDefense Enterprise and AirMagnet Enterprise. Zero, one, or more RF Sensors 331 may be attached to each PoE/VLAN Switch 313. RF Sensors 331 provide characterization of the RF environment in the Wireless Network 110, providing information of device connectivity, device location, time of connectivity, and duration of connection. Information from the RF Sensor 331 is used to populate the Security Database 510 and the Usage Database 530.

RF Security Server 330 couples to PoE/VLAN Switches 313. The RF Security Server 330 functions to maintain security database and perform security monitoring of data from the RADIUS Server 320 and the RF Sensors 331. The RF Security Server 330 receives data from the RF Sensors 331, compares the information against preset thresholds and sends out alerts or disconnects end User Devices 311 based on security policies. The RF Security Server 330 is configured with the "Authorized List" of devices and the "Allowed List" of associations. It is set up so that devices that are not on the lists are automatically blocked from coupling to any other devices.

Building Router 340 couples to PoE/VLAN Switches 313 and allows for connectivity to the Network Operations Center (NOC) 360. Building Router 340 manages forwarding of the tagged traffic of the Wired Private Networks 140. Additionally, Building Router 340 serves IP addresses on the network. Router 340 may also be used to couple each Coverage Area 301 to additional Coverage Areas 301. This ability to interconnect multiple Coverage Areas 301 allows for enormous roaming capability of User Devices 311. For example, a User Device 311 in one location that is within a Coverage Area 301, and requires access to a Private Network 140 at an entirely different location may be able to authenticate the User Device 311 at its location and still be able to access the Private Network 140 at another location, without any loss in security or privacy. This can be done in several ways. In one instance, the end user is authenticated by a RADIUS Server 320 and assigned to a WVLAN that is configured on the a WLAN Switch 315 in another Coverage Area 301. The WLAN Switch 315 that the User Device 311 is coupled to will poll other WLAN Switches 315 to determine which one has the appropriate WVLAN. This request is forwarded on to all other coverage areas by the Building Router 340. The WLAN Switch 315 with the required WVLAN configuration will reply to the requesting WLAN Switch 315 and establish a GRE tunnel between the two WLAN Switches 315 so that traffic from the end User Devices 311 is sent to its "home" WLAN Switch 315 to be forwarded to other users in the same WVLAN. In another instance, users who authenticate to a WLAN Switch 315 that does not have its WVLAN configured locally will be placed on a WVLAN dedicated for roaming users. This Roaming VLAN forwards the end user to the Building Router 340 which will ask for user credentials and authenticate the user again against Roamer Database located at the NOC 360. Upon successful authentication, the Building Router 340 will forward the end user traffic to the corresponding Building Router 340 located in the "home" building of the end user. The "home" Building Router 340 will then forward the end users traffic to the PoE/VLAN network with the appropriate 802.1q tag in order that it will be passed through the proper Access Port 342 coupled to the end user's corporate network. There are no geographic limitations on this roaming capability as long as the device is located within a Coverage Area 301.

NOC (Network Operations Center) 360 is a remote operations center that provides monitoring of Wireless Networks 110. NOC 360 contains a Router 361, Network Monitor 362 and a Session Monitor 363. NOC 360 couples to all Coverage Areas 301 by the Building Router 340 of each Coverage Area 301. NOC 360 functions to provide configuration for customer accounts and the Wireless Networks 110. Additionally, NOC provides the Security Proctor 130. The Network Operations Center 360 is comprised of the Session Monitor 363, which aggregates session statistics from the WLAN Switch 315 of each building and the Network Monitor 362, which aggregates device performance statistics and security statistics from each building network. The Network Operations Center 360 is the location from which the network engineers resolve support and security issues.

NOC Router 361 allows for connectivity between Coverage Areas' 301 Wireless Networks 110 and serves IP addresses on the NOC 360 network. Security Proctor 130 provides monitoring for all wireless activity. The Security Proctor 130 monitors User Device MAC addresses, Access Point 312 connectivity, which encryption protocols are being used, if the device is encrypted and if the device has been authenticated. Additionally, the Network Monitor 362 monitors the broader RF environment for all Wi-Fi devices, all access points within the coverage area 301, whether the access points are managed Access Points 312 or unauthorized APs and all device connectivity to all access points. The Security Proctor 130 provides a vital role in security of Wireless Networks 110.

The Network Monitor 362 measures the reachability and performance of all devices on the network. It also pulls statistics via SNMP, telnet, and XML from devices and stores this information for alerts and reporting.

Session Monitor 363 monitors all User Device 311 session activity. The Session Monitor 363 monitors the User Device 311 MAC Address 531, Device Username 532, Device VLAN 533, Time Seen of Device on the Network 534, Device SSID 535, Device Associations with AP 536, signal to noise ratio, signal strength, connectivity speed, and data throughput. The Session Monitor 363 also aggregates end user authentication data and error log messages associated with each end user. Session Monitor 363 provides a vital role in security of Wireless Networks 110 as well as maintaining adequate connection quality and performance of end user devices for effective network management, troubleshooting, end user support, as well as usage and compliance reporting. In one embodiment, the Session Monitor 363 contains multiple views and dash boards for real time monitoring of end user and network status. The initial dashboard provides a web page listing all user devices coupled to network and includes the sessions number, username, MAC address, VLAN name, Access Point 312, WLAN Switch 315, signal to noise ratio (SNR), relative signal strength index (RSSI), and total data throughput for the session. If the user's SNR is above 20, the number is highlighted in green. If the SNR is between 10 and 19, the number is highlighted in yellow to warn that there may be an issue with the connection strength of the device. If the SNR is lower than 10, the number is highlighted in red to indicate that the connection strength is too weak to provide adequate performance. Clicking on any username or MAC address will launch a web page reporting the same statistics for that username or device over time allowing network administrators to see trends in usage, performance, and location. The dashboard also sorts through the SNMP information stored in the network monitor and lists the top ten devices with the most instances of a particular SNMP trap. This will give a list of the devices with the most authentication failures, successes, and access point roaming in order for network administrators to predict potential RF, device, or configuration issues. The Session Monitor 363 also generates usage reports for each individual device listing the total time coupled to the network and total data passed through the network on a daily, weekly, and monthly basis. Sections of the Session Monitor 363 can be accessed by customer administrators or building security contacts so that they can view real time usage statistics of devices in their WVLANs or buildings.

Punch Panels 341 couple to PoE/VLAN Switches 313. Preferably one Punch Panel 341 is coupled to each PoE/VLAN Switch 313. Punch Panels 341 provide connectivity between the Private Network 140 and the PoE/VLAN Switches 313. It is preferable to use existing building cabling in the form of Punch Panels 341 to couple and Access Port 342 to a port on a PoE/VLAN Switch 313. However, if no existing cabling exists between the telecom closets and a tenant suite, a new Ethernet cable can be run or a wireless bridge can be utilized.

Access Ports 342 couple to the Punch Panels 341. Zero, one, or more Access Ports 342 may couple with each Punch Panel 341. Access Ports 342 are RJ-45 type connectors, but other acceptable connectors may also be utilized, as is well known to those skilled in the art. Access Ports 342 are tagged for the proper identification of each Wired Private Network 140.

Wired Private Networks 140 couple to the Access Ports 342. By coupling the Wired Private Networks 140 in this fashion User Devices 311 are able to access the appropriate Private resources. Only one Wired Private Network 140 may couple to each Access Port 342.

Figure 4:
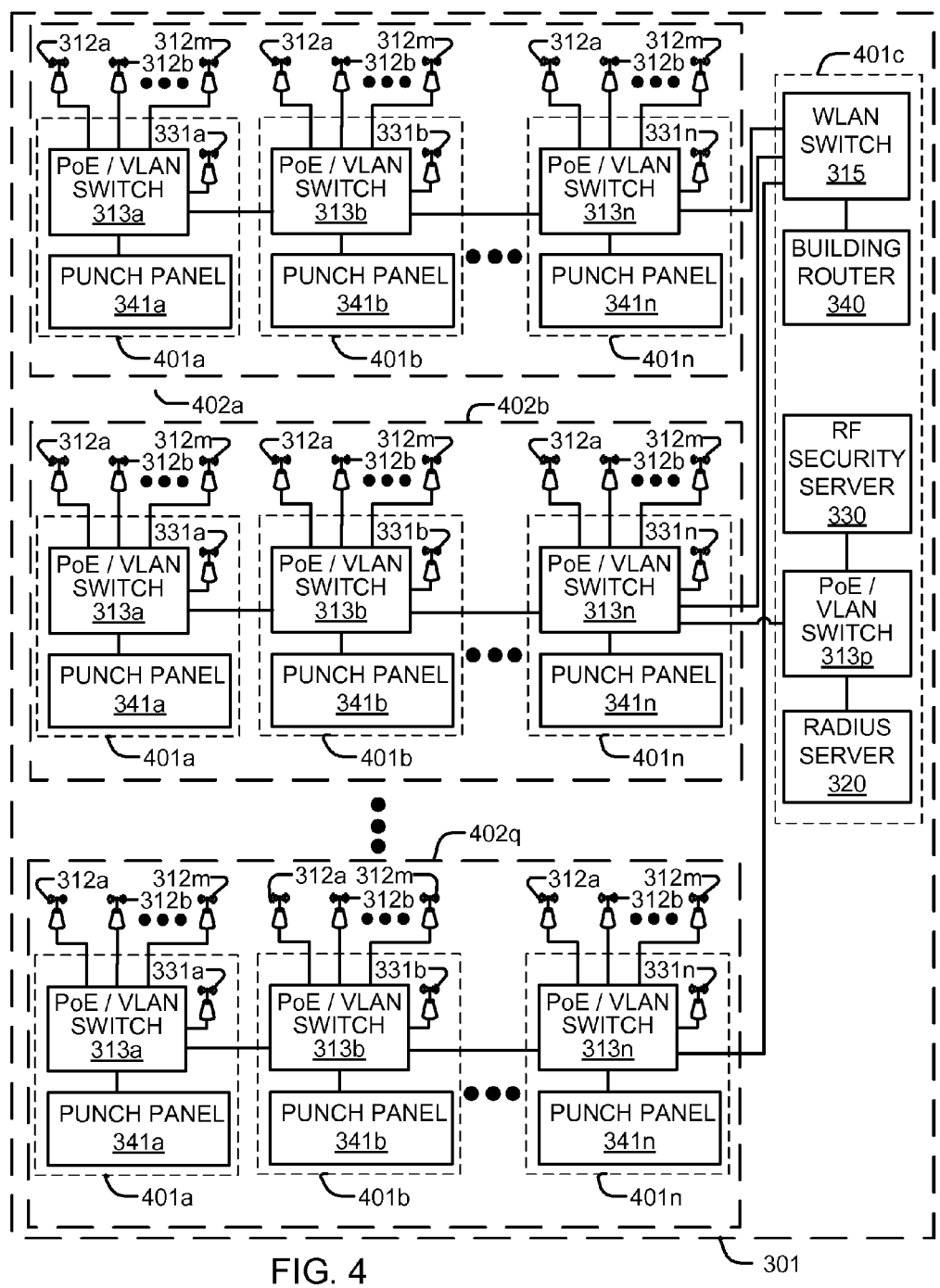
FIG. 4 shows a schematic block diagram of a detailed component layout within a coverage area for the wireless system of FIG. 1.

FIG. 4 shows a schematic block diagram of a detailed component layout within a Coverage Area 301 for the wireless system. The purpose of this diagram is to illustrate the typical layout of components in a typical site, such as a multi story building, which has Physical Subsections 402. Each Physical Subsection 402 of the Coverage Area 301 may contain one or more PoE/VLAN Switches 313 as is required to provide complete coverage of the Physical Subsection 402. One or more Physical Subsection 402 may exist in the Coverage Area 301. Examples of Physical Subsections 402 are separate floors in a building, multiple buildings on a campus, or any locations that are separated from one another.

Each PoE/VLAN Switch 313 is coupled to one or multiple Punch Panels 341 and RF Sensor 331. PoE/VLAN Switch 313, Punch Panel 341 and RF Sensor 331 are stored in a Physically Secured Location 401 in order to limit the possibility of tampering with these devices. The nature of the Physically Secured Location 401 may vary by Coverage Area 301, building architecture and availability of suitable locations. Examples of a Physically Secured Location 401 include a Telco closet, building administrative office or electrical room. The Coverage Area 301 security contact will typically have access to the Physical Subsections 402 in order to perform inspections, configurations or to assess security threats, should the need arise. Access Points 312 are distributed within the Physical Subsection 402 as to provide complete coverage. One or more Access Points 312 may be coupled to each PoE/VLAN Switch 313. As discussed earlier, RF mapping is utilized in order to determine the deployment of Access Points 312 within the Physical Subsection 402.

RADIUS Server 320 and RF Security Server 330 couple to a PoE/VLAN Switch 313. WLAN Switch 315 couples to the PoE/VLAN Switches 313 of each Physical Subsection 402. The WLAN Switch 315 is coupled to the building Router 340. RADIUS Server 320, RF Security Server 330, WLAN Switch 315 and Router 340 are all located in a Physically Secured Location 401. All of these devices are on a dedicated management VLAN.

Figure 5A:
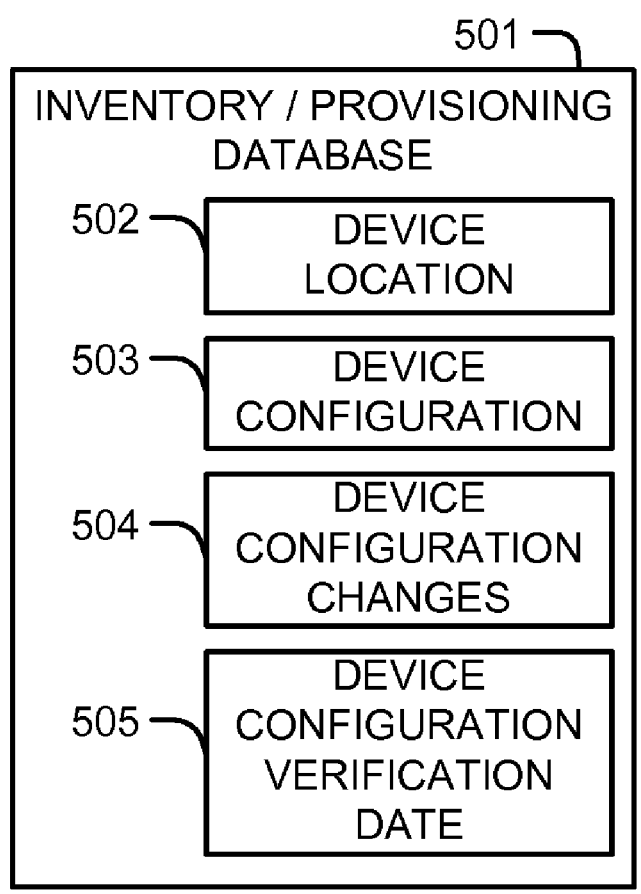
FIG. 5A shows a functional block diagram of the inventory and provisioning database for the wireless system of FIG. 1.

FIG. 5A shows a functional block diagram of the Inventory and Provisioning Database 501 in accordance with an embodiment of the present invention. The Inventory /Provisioning Database 501 is maintained to track all network devices. Inventory and Provisioning Database 501 is maintained on servers residing in the Network Operations Center. The Inventory/Provisioning Database 501 keeps track of Device locations 502, Device Configuration 503, Changes made to Device Configuration 504, and Dates of Device Audits for Verification of Configuration 505. Changes can be made after a change management request has been submitted, approved and documented. Audits of device configurations may be made and documented on a periodic basis. The Inventory/Provisioning Database 501 is used for stock record purposes and to guard against security threats.

Figure 5B:
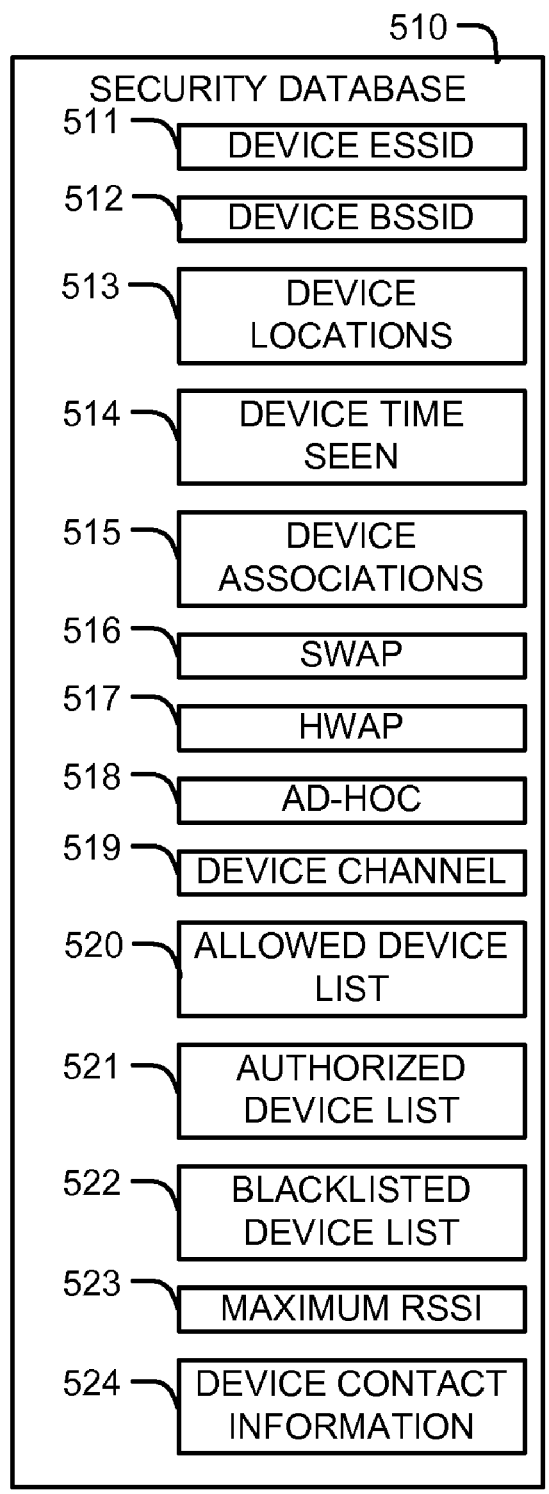
FIG. 5B shows a functional block diagram of the security database for the wireless system of FIG. 1.

FIG. 5B shows a functional block diagram of the Security Database 510 in accordance with an embodiment of the present invention. Security Database 510 is maintained at the Network Operations Center. Security Database 510 is maintained to track information on all user devices on the network including, but not limited to: Device ESSID (Extended Service Set Identifier) 511, Device BSSID (Basic Service Set Identifier) 512, Device Location 513, Time Seen of Device on the Network 514, Device Associations 515, SWAP 516, HWAP 517, AD-HOC Devices 518, Allowed Device list 520, Authorized Device list 521, Blacklisted Devices 522, Device Channel 519, Max RSSI 523 and Device Contact Information 524. The Security Database 510 is used for ensuring the security and privacy of user devices and Private Networks 140.

Figure 5C:
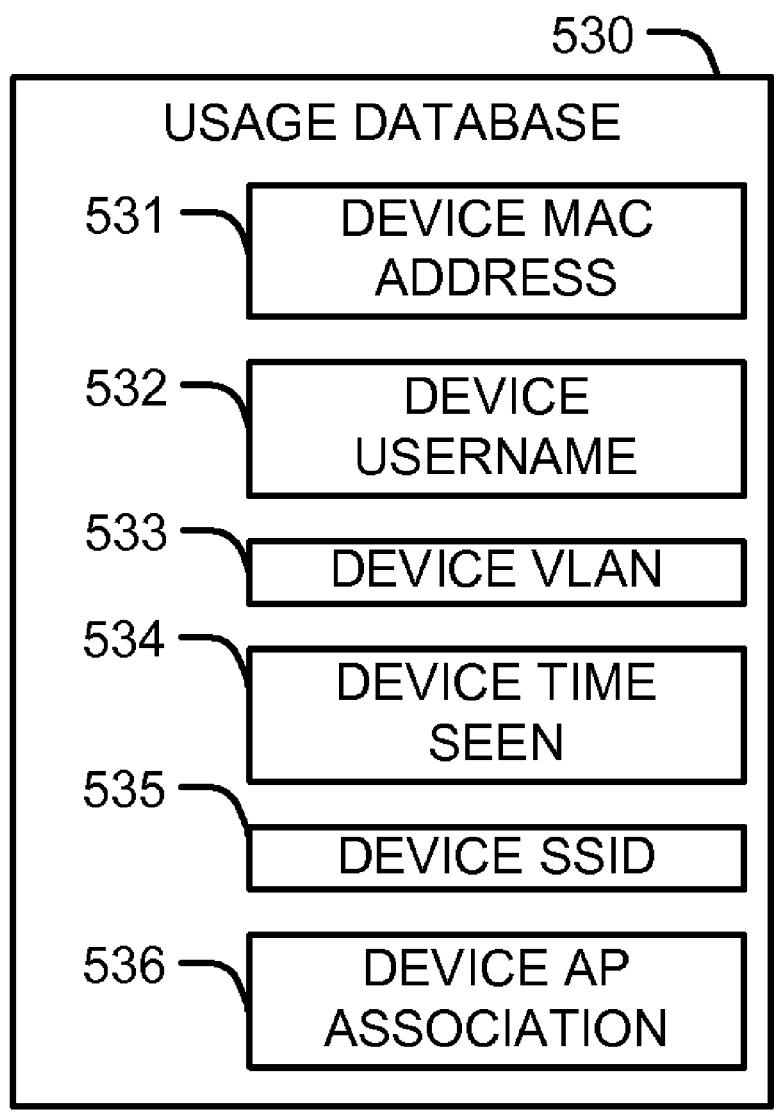
FIG. 5C shows a functional block diagram of the usage database for the wireless system of FIG. 1.

FIG. 5C shows a functional block diagram of the Usage Database 530 in accordance with an embodiment of the present invention. Usage Database 530 is maintained on a server located at the Network Operations Center 360 and is populated by the Session Monitor 363. Usage Database 530 tracks all user device usage with, but not limited to: Device MAC Address 531, Device Username 532, Device VLAN (Virtual Local Area Network) 533, Time Seen of Device on the Network 534, Device SSID 535, Device Associations with AP 536, authentication attempts, and traffic throughput. The logical information contained in the Usage Database 530 is used to keep data available on user trends, and for security purposes.

Figure 6A:
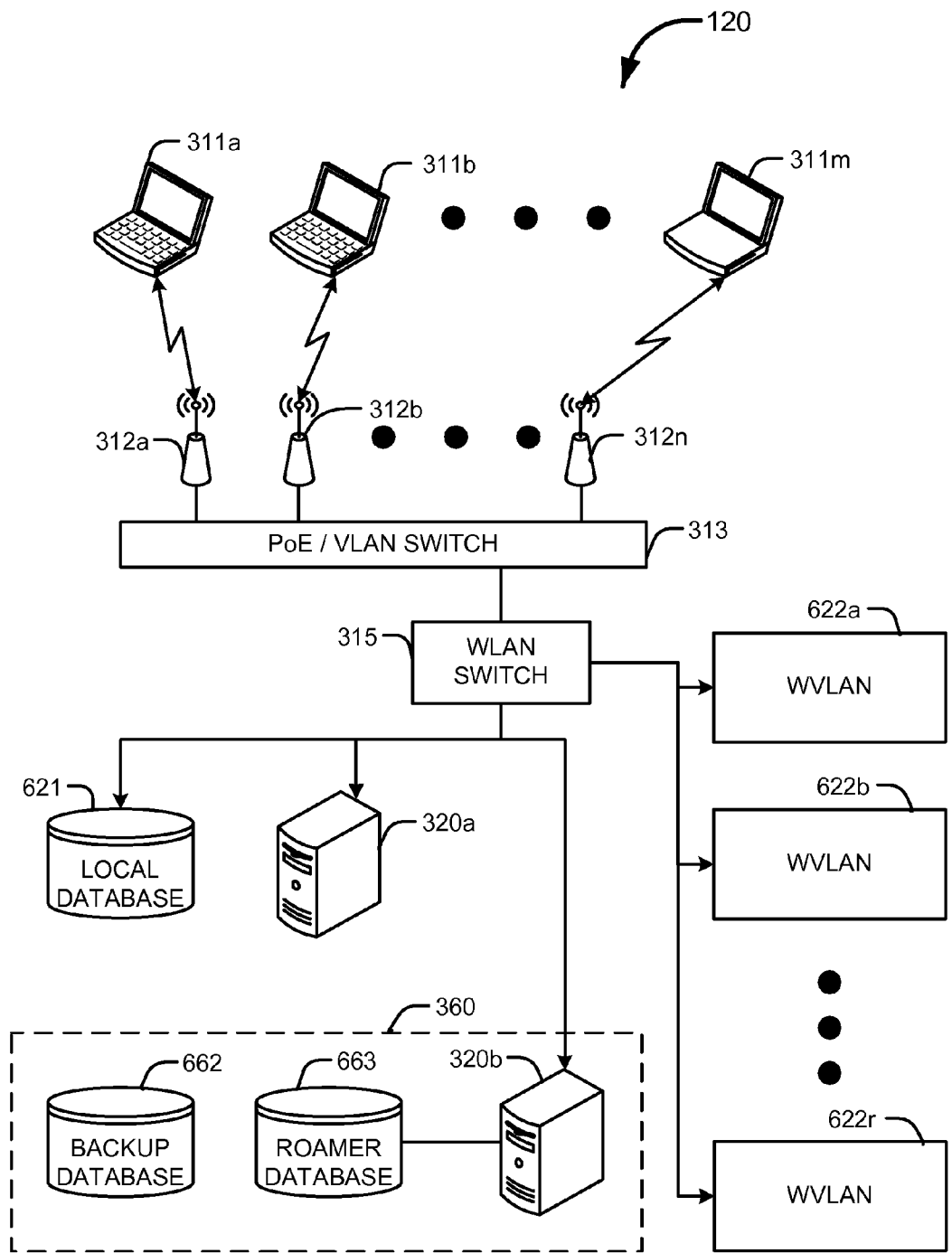
FIG. 6A shows a functional block diagram illustrating the authentication framework for the wireless system of FIG. 1.

FIG. 6A shows a functional block diagram illustrating one embodiment of the authentication framework for the short range, secure wireless system in accordance with an embodiment of the present invention. User Devices 311 couple wirelessly to Access Points 312. Access Points 312 couple to a PoE/VLAN Switch 313, which provides connectivity from the Access Points 312 to the WLAN Switch 315.

WLAN Switch 315 utilizes RADIUS Server 320 to authorize User Device 311 certificate and/or MAC address along with username and password supplied by the user first, against the user credentials stored within the WLAN switch 315. If the user credentials are not found, the WLAN Switch 315 will then check the Local Database 621 located in the Local Coverage Area 301. If the RADIUS Server 320 does not respond, the WLAN Switch 315 will then authenticate the User Device 311 against the RADIUS Servers 320 located in the Network Operations Center 360. In one embodiment, Local Database 621 may be a secure LDAP directory. A Backup Database 662 is located in the NOC 360 and is used to back up the Local Database 621. If User device 311 credentials are not found in the Local Database 621, the WLAN Switch 315 attempts to authorize User Device 311 against a Roamer Database 663 located in the NOC 360. As with Local Database 621, the Roamer Database 663 is a secure LDAP directory, in some embodiment.

After User Device 311 is authenticated it is placed into the appropriate WVLAN 622 by the WLAN Switch 315 according to access policies developed by management. User Device 311 credentials are compared against access policies to determine WVLAN placement.

Figure 6B:
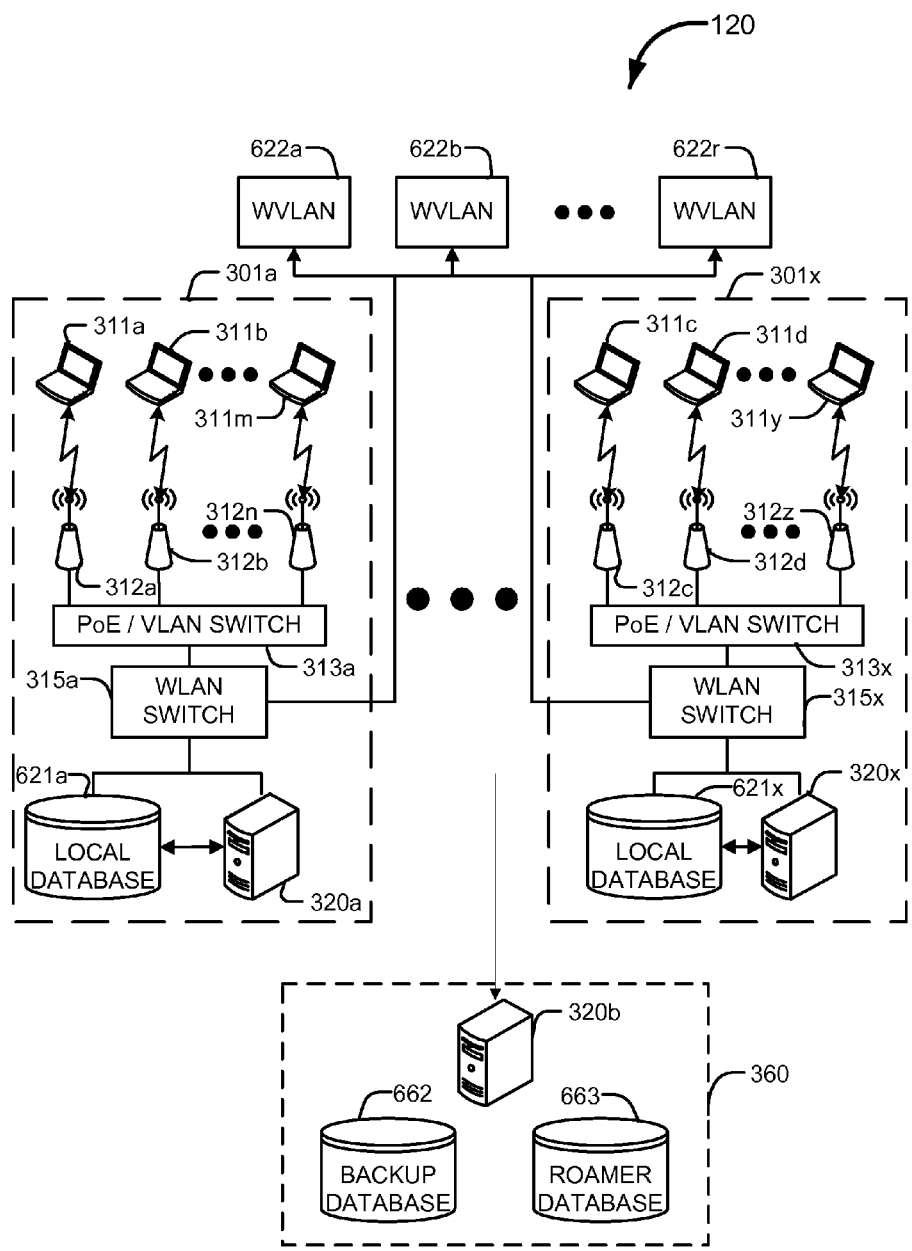
FIG. 6B shows functional block diagram illustrating the authentication framework in a multi building roaming for the wireless system of FIG. 1.

FIG. 6B shows functional block diagram illustrating the authentication framework in a multi building roaming environment in accordance with an embodiment of the present invention. Here, two or more Coverage Areas 301 are shown. These Coverage Areas 301 are physically distinct locations. In one embodiment each Coverage Area 301 would be separate multi tenant buildings. Within each Coverage Area 301 User Devices 311 couple wirelessly to Access Points 312. Access Points 312 couple to a PoE/VLAN Switch 313, which provides connectivity from the Access Points 312 to the WLAN Switch 315.

Each WLAN Switch 315 utilizes the RADIUS Server 320 within its Coverage Area 301 to authorize User Device 311 certificate and/or MAC address along with username and password supplied by the user against the Local Database 621 of each Coverage Area 301. In one embodiment, each Local Database 621 is a secure LDAP directory. A Backup Database 662 is located in the NOC 360 and is used to back up all of the Local Databases 621. If User device 311 credentials are not found in the Local Database 621 of the Coverage Area 301, the RADIUS Server 320 of that Coverage Area 301 attempts to authorize the User Device 311 against the Roamer Database 663 located in the NOC 360. As with the Local Databases 621, the Roamer Database 663 is a secure LDAP directory in some embodiment. In this fashion User Devices 311 that are roaming may still be authenticated, even if the Local Database 621 in the Coverage Area 301 that the User Device 311 is in does not contain that User Device's 311 credentials.

After User Device 311 is authenticated it is placed into the appropriate WVLAN 622 by the WLAN Switch 315 according to access policies developed by management. User Device 311 credentials are compared against access policies to determine WVLAN placement. WVLANs are not physically confined to any particular Coverage Area 301 and User Devices 311 from any Coverage Area 301 may be placed into any appropriate WVLAN from any Coverage Area 301. Thus, User Devices 311 may couple to a Private Network 140 in another location than itself as if it were at the location of the Private Network 140, allowing for mobility of User Devices 311 that are in no way encumbered by reduced security concerns when roaming.

Figure 7:
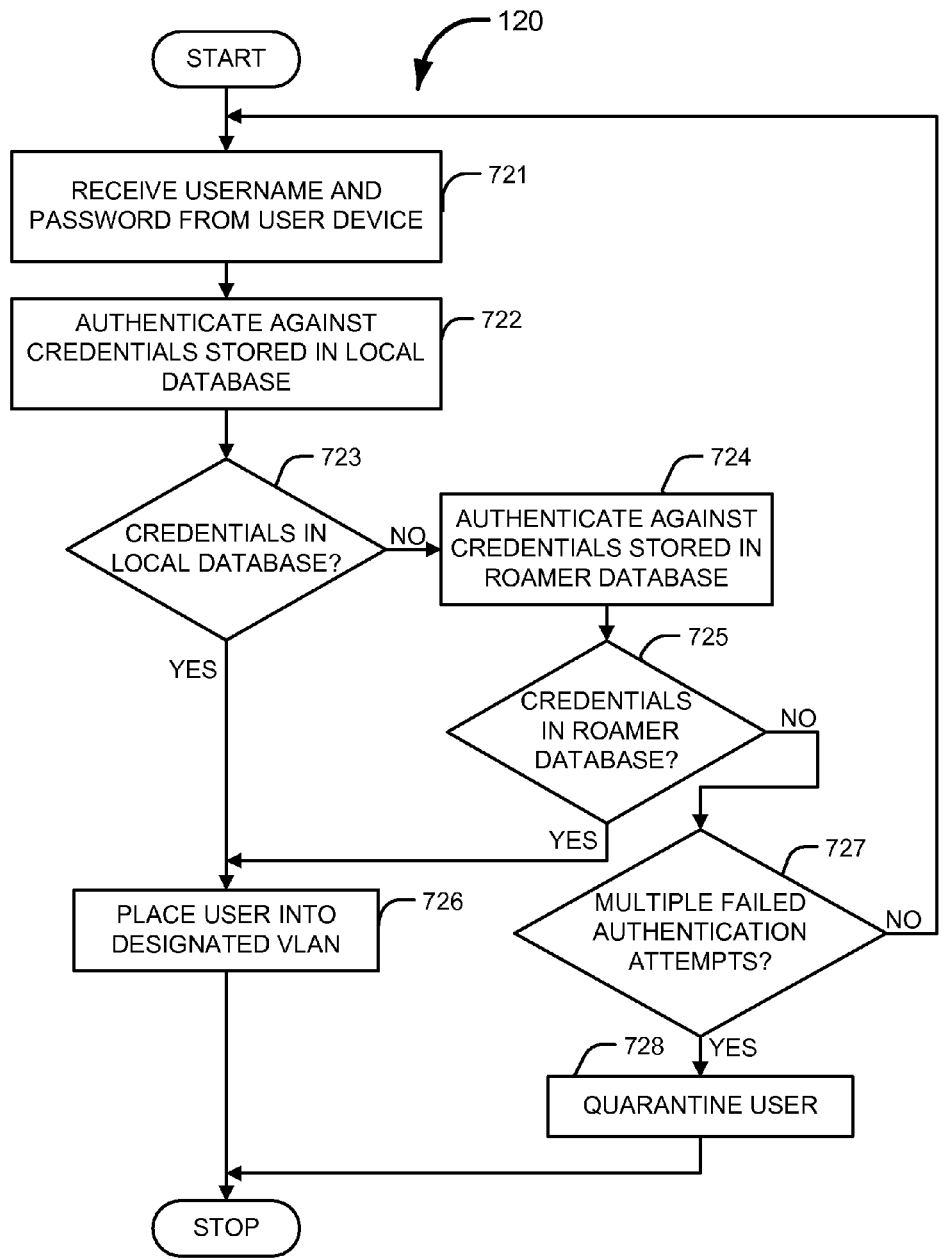
FIG. 7 shows a flow chart illustrating the process of user device authentication for the wireless system of FIG. 1.

FIG. 7 shows a flow chart 120 illustrating the process of user device authentication in accordance with an embodiment of the present invention. In this process, the User Device 311 authorizes through the RADIUS Server 320 by starting at step 721 by providing user name and password to the RADIUS Server 320 along with certificate and/or MAC address. In some embodiments, passwords are not known to anyone beyond user for enhanced security. If a password is lost, a new password may be generated. Password policies may be strong to limit security vulnerability.

In the next step 722, the RADIUS Server 320 attempts to authenticate against the Local Database 621, a secure LDAP Directory in one embodiment. If the credentials are stored in the local Database 621, then the User Device 311 is authenticated and placed into its appropriate WVLAN 622 in step 726. Otherwise, in step 723, the credentials are not found in the Local Database 621, and in step 723 the RADIUS Server 320 attempts to authenticate against the Roamer Database 663, another secure LDAP directory located in the NOC 360. If the credentials are found in the Roamer Database 663, then the User Device 311 is authenticated and placed into its appropriate WVLAN 622 in step 726. Otherwise, in step 725, the user credentials are not in the Roamer Database 663, and this may signify that an unauthorized user is attempting an authorization hack. If there have been multiple failed authentication attempts by the User Device 311, then the User Device 311 is quarantined in step 728. In some embodiment, Devices/accounts placed in quarantine can only be reinstated by a pre-approved customer account administrator (security contact). Otherwise, in step 727, the User Device 311 is not deemed to be a security threat and can begin the process over in order to authenticate. In addition to username and password, the credentials used to authorize an end User Device 311 may also include other access policies including, but not limited to, MAC address, time of day, dates, and/or location by Access Point 312.

Figure 8A:
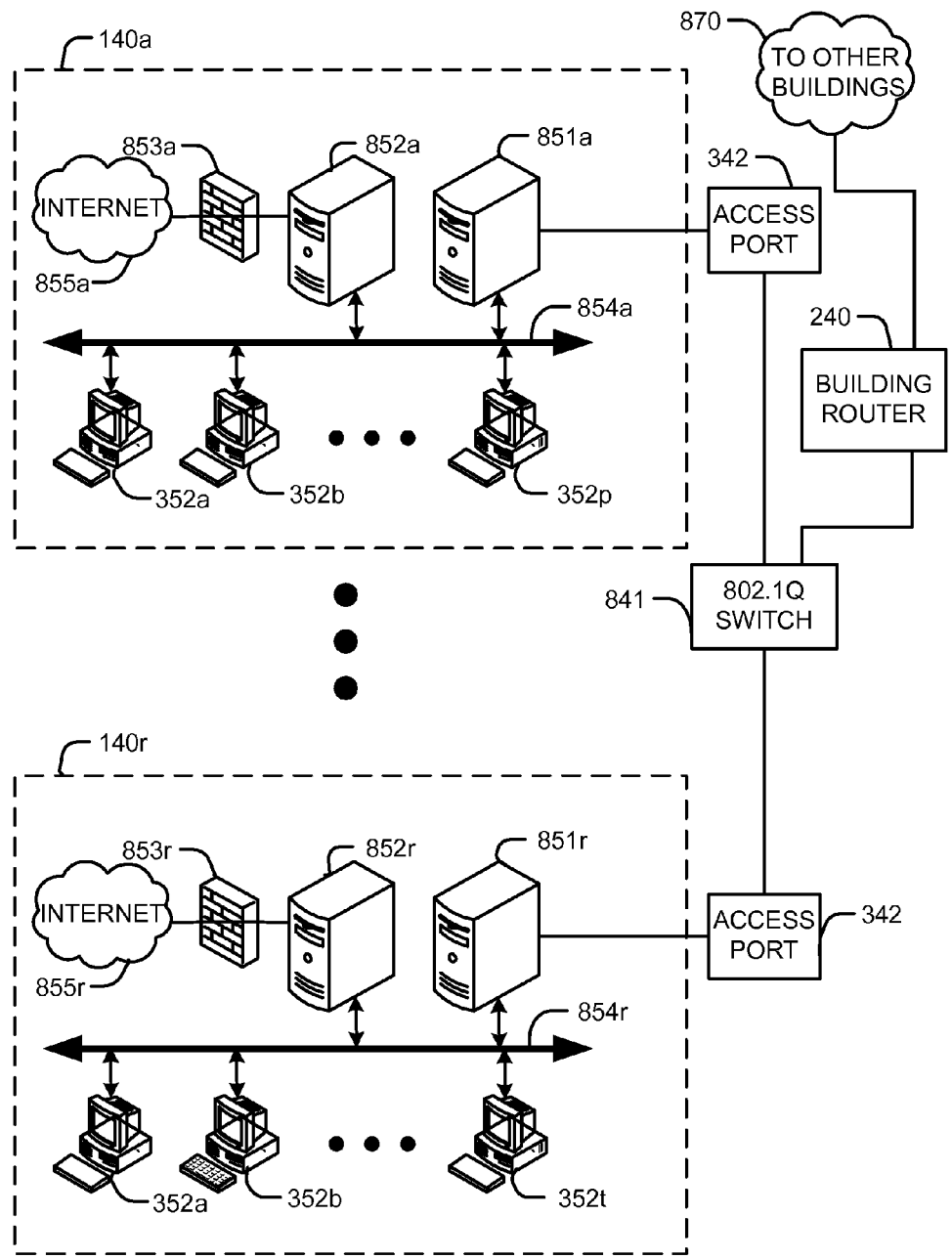
FIG. 8A shows a functional block diagram illustrating the Private Network architecture for connection to the wireless network through a wired connection for the wireless system of FIG. 1.

FIG. 8A shows a functional block diagram illustrating the Private Network 140 architecture for connection to the wireless network through a wired connection in accordance with an embodiment of the present invention. The Building Router 340 couples to the Wired Private Networks 140 through Access Ports 342. In some embodiment, the Router 340 securely forwards tagged traffic from an 802.1q Switch 841 based on 802.1q VLAN separation to allow multiple bridged networks to transparently share the same physical network link without leakage of information between networks, ensuring privacy of Wired Private Networks 140.

The Router 340 also provides connectivity between the Private Network 140 and other Private Networks 140 at other locations. There may be one or more Wired Private Networks 140 in each Private Network 140. In one embodiment the Wired Private Network 140 includes a Gateway Server 851 that couples through the Access Port 342 to the Router 340. Each Access Port 342 is tagged. Each Gateway Server 851 may be coupled to one VLAN through the tagged Access Port 342. An alert may be generated at the NOC 360 as soon as any gateway loses connection from specified Access Port 342.

Gateway Server 851 couples to the Private LAN 854 and provides connectivity between the Private LAN 854 the 802.1Q Switch 841. In one embodiment a Private Server 852 provides connectivity between the Private LAN 854 and the Internet 855 through a Firewall 853, allowing for Wireless User Device 311 access to the Internet 855 through the appropriate Private Network 140. One or more Private Computers 352 are coupled to the Private LAN 854. In some embodiments additional private resources may be coupled to the Private LAN 854 including, but not limited to, printers, servers, databases, network telephones and fax machines. The Gateway Server 851 acts as a firewall for wireless traffic to enter the Wired Private Network 140. The Gateway Server 851 may screen traffic allowing only certain types of IP traffic (e.g. Internet only) and may also allow only traffic from certain devices (MAC addresses) to enter the Wired Private Network 140. The Gateway Server 851 is optional—the Access Point 312 may be coupled directly into the Private LAN 854 with an Ethernet cable.

Figure 8B:
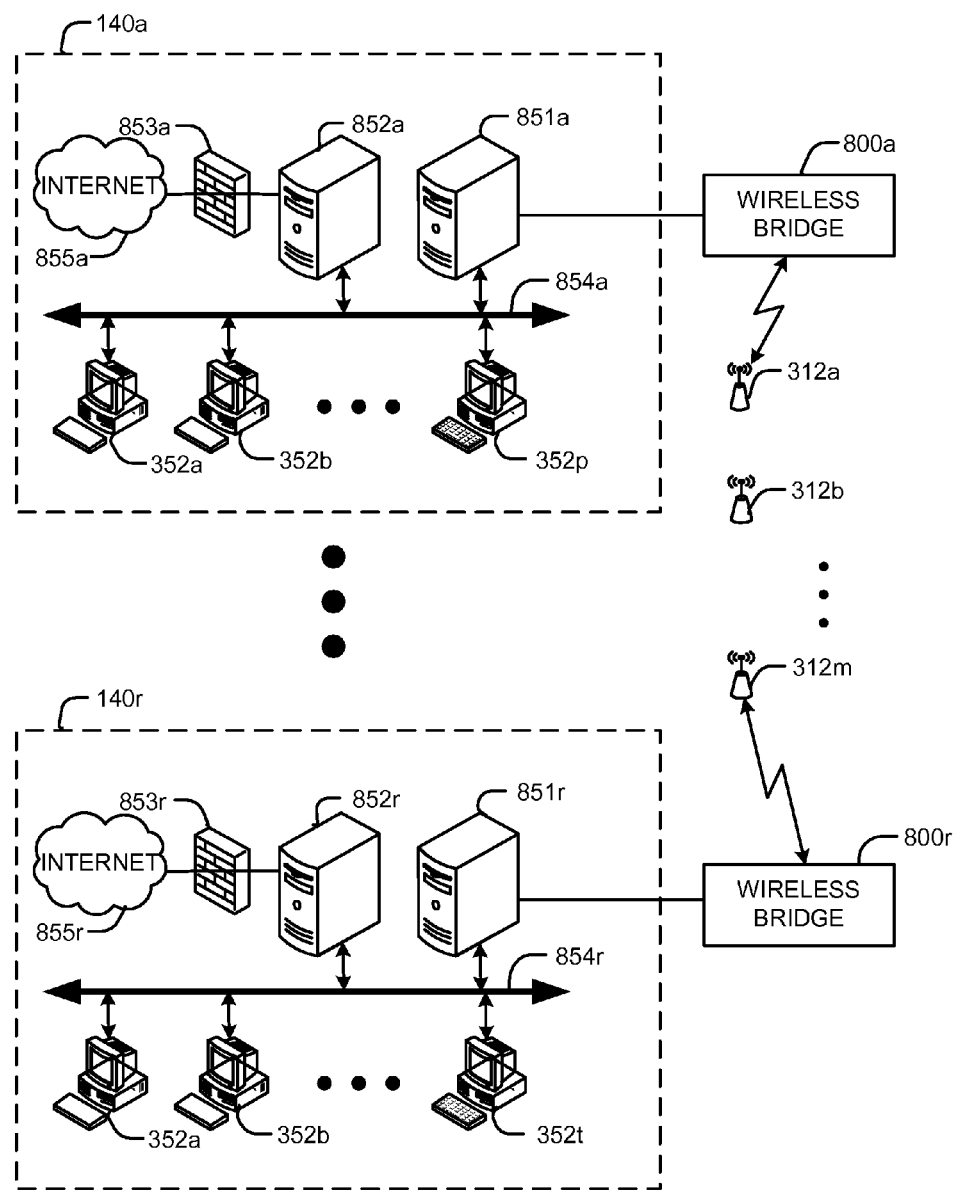
FIG. 8B shows a functional block diagram illustrating the Private Network architecture for connection to the wireless network through a wireless-to-Ethernet bridge for the wireless system of FIG. 1.

FIG. 8B shows a functional block diagram illustrating the Private Network 140 architecture for connection to the Wireless Network 110 through a Wireless-to-Ethernet Bridge 800 in accordance with an embodiment of the present invention. In this alternate embodiment of the present invention the Private Network 140 couples through the Wireless-to-Ethernet Bridge 800 directly to the Access Points 312 that are in place for the Wireless Network 110. This embodiment allows for total mobility of the Private Network 140 since the Wireless-to-Ethernet Bridge 800 may be relocated anywhere within the Coverage Area 301, there are no physical restrictions related to the placement of the Private Network 140 and deployment of Private Network 140 is cost and time efficient.

As with the embodiment outlined in Private Network 140 architecture for FIG. 8A, in this embodiment Private Network 140 includes a Gateway Server 851 that couples to the Wireless-to-Ethernet Bridge 800. Each Gateway Server 851 may be coupled to one VLAN. One or more Wireless Bridges 800 may be used by each Wired Private Network 140, as is required for performance.

Gateway Server 851 couples to the Private LAN 854 and provides connectivity between the Private LAN 854 the Wireless-to-Ethernet Bridge 800. In some embodiment a Private Server 852 provides connectivity between the Private LAN 854 and the Internet 855 through a Firewall 853, allowing for Wireless User Device 311 access to the Internet 855 through the appropriate Private Network 140. One or more Private Computers 352 are coupled to the Private LAN 854. In some embodiments additional private resources may be coupled to the Private LAN 854 including, but not limited to, printers, servers, databases, network telephones and fax machines.

Figure 8C:
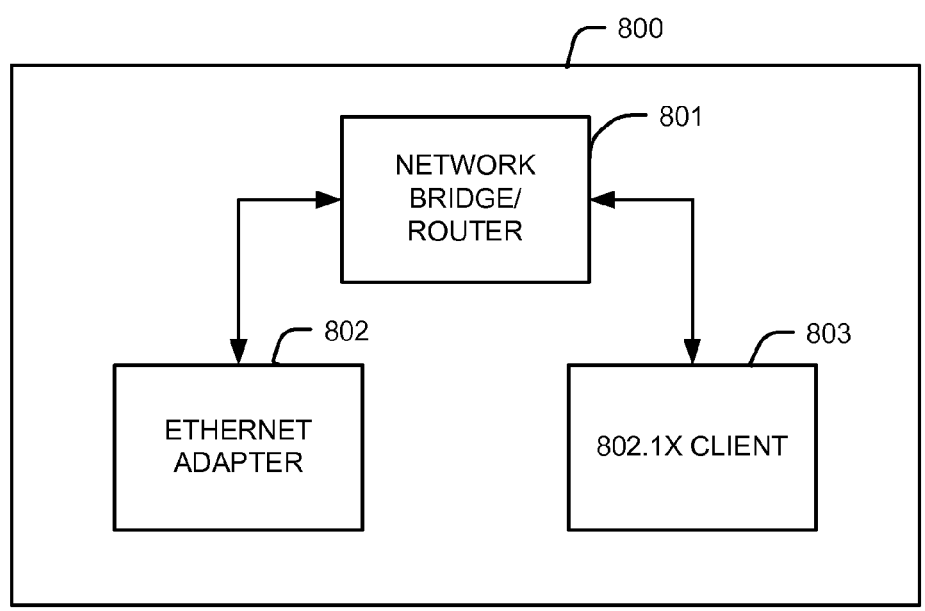
FIG. 8C shows a functional block diagram illustrating the wireless-to-Ethernet bridge for the wireless system of FIG. 1.

FIG. 8C shows a functional block diagram illustrating the Wireless-to-Ethernet Bridge 800 in accordance with an embodiment of the present invention. In some embodiment, Wireless-to-Ethernet Bridge 800 includes a PC running 802.1x compliant software 803 and an 802.11 hardware device acting as a Network Bridge and/or a Router 801 between the Private LAN 854 and the WVLAN. The Bridge/Router 801 is able to couple to the Wireless Network 110 via 802.1x Client 803 and thereby provide secure communications to the Wireless Network 110. An Ethernet adapter 802, or an additional network interface, on the PC is coupled to the wired Private LAN 854 and bridging/routing software is used to establish a connection between the two (or more) network ports on the device. It is important to note that there are other acceptable methods available to create a Wireless Bridge 800, as is well known to those skilled in the art.

Figure 9A:
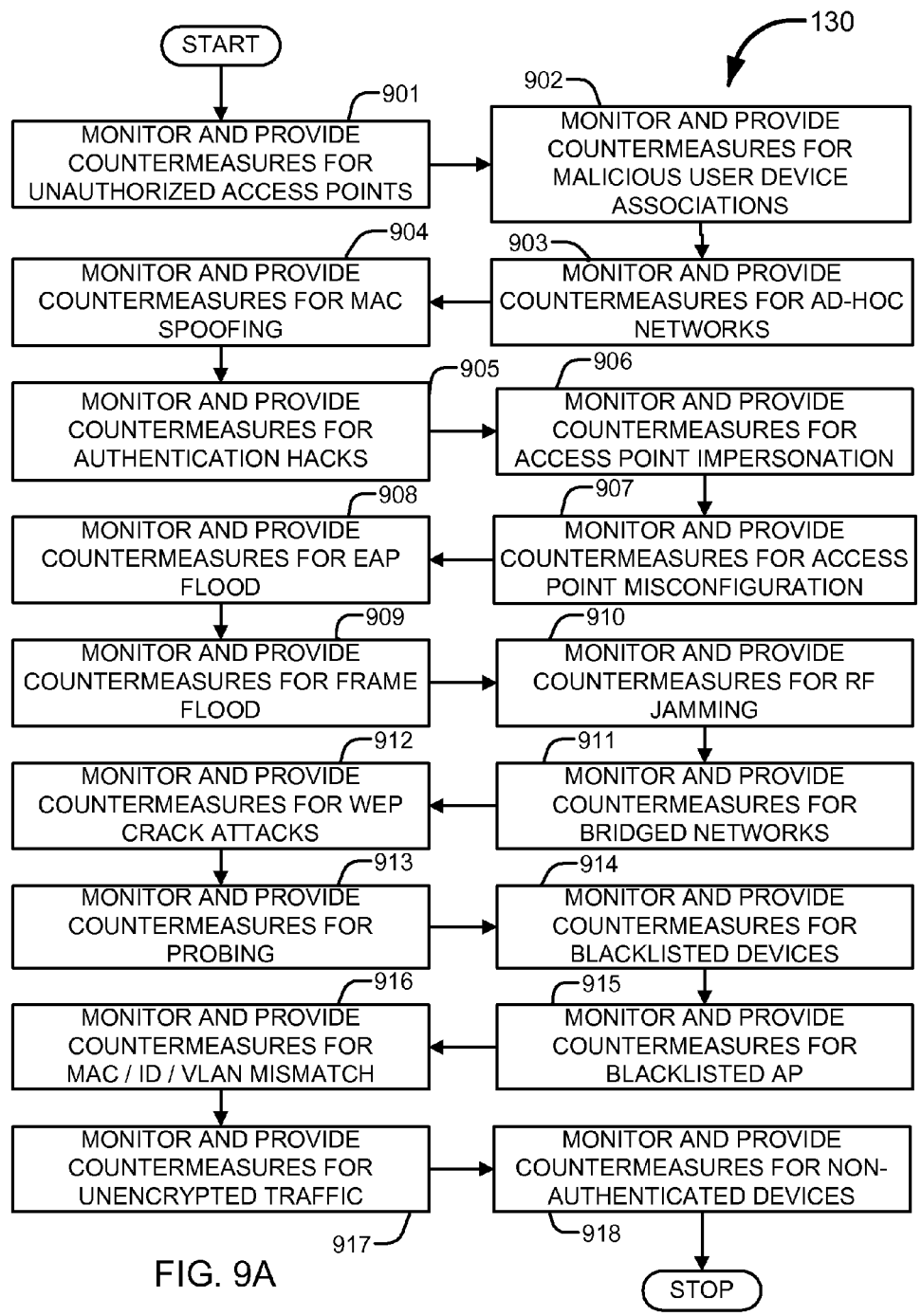
FIG. 9A shows a flow chart illustrating the security proctor for the wireless system of FIG. 1.

FIG. 9A shows a flow chart illustrating the Security Proctor 130 in accordance with an embodiment of the present invention. In this process unauthorized access points are monitored for and upon detection countermeasures are instated, starting at step 901. Unauthorized access points include any devices transmitting unknown or new SSID (service set identifier). Unauthorized access points may couple with User Devices 311, thereby compromising the Wireless Network 110. By monitoring device SSID, unauthorized access points may be blocked and, if necessary, physically removed; in so doing the risk of a security breach by unauthorized access point is limited.

In step 902, malicious User Device 311 associations are monitored for and upon detection countermeasures are instated. Malicious User Device 311 associations include any attempted connection between an authorized User Device 311 and any other device not found on the Allowed List 520 or the Authorized list 521. A malicious device association may lead to bridging of networks and/or access into the secure Wireless Network 110. By monitoring all authorized User Device 311 associations and upon detection immediately logging the device off of the secure Wireless Network 110, the threat of a malicious device association can be minimized.

In step 903, AD-HOC networks are monitored for and upon detection countermeasures are instated. AD-HOC networks can allow access to the secure Wireless Network 110 either through User Device 311 creating an AD-HOC network or attempting to couple to one. AD-HOC networks are identifiable by IBSS ID (Independent Basic Service Set Identifier) transmission. By monitoring for AD-HOC networks or associations to AD-HOC networks, blocking it and, if necessary, removing the device engaged in AD-HOC networking, the risk of a security compromise is limited.

In step 904, MAC spoofs are monitored for and upon detection countermeasures are instated. Although physical MAC addresses are permanent by design, several mechanisms allow modification, or "spoofing", of the MAC address that is reported by the operating system. MAC spoofing is utilized in order to gain access to the Wireless Network 110. When multiple devices with the same MAC address are identified the devices are logged off of the network to limit security risk. Authentication records are also reviewed in order to identify and prevent future authentication of MAC spoof devices.

In step 905, authentication hacks are monitored for and upon detection countermeasures are instated. Authentication hacks allow an unauthorized device access to the secure Wireless Network 110. Authentication hacks are identified by multiple authenticated sessions by a single User Device 311, in which case all devices reporting a duplicated authenticated session are logged off the Wireless Network 110 to limit security risks. Multiple failed authentication attempts may also be a sign of an authentication hack, and any device with multiple failed authentication attempts may be quarantined.

In step 906, access point impersonations are monitored for and upon detection countermeasures are instated. Access point impersonations can cause User Devices 311 to couple to an access point not within the management's control. Wireless clients are often designed to couple by default to the strongest available access point. An impersonated access point can be set up by a nearby hacker with a very strong signal that will attract wireless clients. The impersonated access point may be used to access data on the User Device 311. By monitoring for management SSID from unknown devices, impersonated access point may be located and shut down.

In step 907, access point misconfigurations are monitored for and upon detection countermeasures are instated. A misconfigured Access Point 312 may allow for unauthorized devices to access the Wireless Network 110. Configuration changes to the Access Points 312 are monitored, configurations are checked and periodic audits are preformed to ensure proper Access Point 312 configuration.

In step 908, EAP flood/Denial of service attacks are monitored for and upon detection countermeasures are instated. A denial of service attack (also, DoS attack) is an attack on the Wireless Network 110 that causes a loss of service to users, typically the loss of network connectivity and services by consuming the bandwidth of the victim network or overloading the computational resources of the victim system. EAP flooding involves overwhelming and oversaturating bandwidth and depleting the system resources through excessive Access Point 312 usage and authentication. EAP flooding is identifiable by monitoring the Access Point 312 traffic and authentication traffic. Offending devices are quarantined and quiet times are increased for failed authentications, thereby curtailing an EAP flood attack.

In step 909, frame flood/Denial of service attacks are monitored for and upon detection countermeasures are instated. As with EAP Flood attacks, frame flooding is a denial of service attack. Frame flood attacks consume CPU resources of RADIUS Server 320 and NOC servers. Frame flood attacks may be identified by excessive CPU loads, Access Point 312 traffic and/or retransmit rates. As with EAP flood attacks, offending devices are quarantined and quiet times are increased for failed authentications, thereby restricting a frame flood attack.

In step 910, radio frequency jamming is monitored for and upon detection countermeasures are instated. When radio frequency noise becomes too intense User Device 311 connectivity to Access Points 312 is negatively affected, due to the interference. Interference, in an extreme, may render the Wireless Network 110 inoperable. By monitoring noise levels, retransmit rates and error rates, and comparing against thresholds, channels may be changed and power levels to Access Points 312 may be altered to avoid negative impacts on performance. Additionally, it is determinable whether a site inspection is required to resolve interference issues.

In step 911, bridged networks are monitored for and upon detection countermeasures are instated. When a wireless User Device 311 is physically coupled to a wired Private Network 140 while still coupled wirelessly to Access Points 312 a bridge between the wired Private Network 140 and the Wireless Network 110 may be formed, causing network instability and/or private data from the Private Network 140 to be transmitted globally. To combat this security threat, user education is a powerful tool and may be utilized. Additionally, by monitoring for VLAN loops, by checking error logs for spanning tree error messages, bridging may be identified. To limit bridged networks, if the bridging device is a wired device the VLAN may be shut down, otherwise the device is logged off of the Wireless Network 110.

In step 912, WEP crack attacks are monitored for and, upon detection, countermeasures are instated. WEP cracking tools are readily available, and by cracking encryption, hackers may access transmitted data. Users attempting to crack the WLP key may be able to create a session with an access point without authentication. This can be identified by monitoring for devices coupled to the network without passing authentication. Such devices will not be assigned to a wireless VLAN and cannot pass traffic to any Private Network 140. When WEP cracking tools are identified, all sessions are cleared, and User Devices 311 are re-authenticated.

In step 913, probing is monitored for and upon detection countermeasures are instated. By probing the Wireless Network 110 a device may compromise its security and gain access to data the device is unauthorized to have access to. When probing is detected a record is made of the attempt and, if it is necessary, the probing device may be blacklisted.

In step 914, blacklisted devices are monitored for, and upon detection an alert is performed. Blacklisted devices are devices in the Blacklisted Device List 522, and may signify a security threat.

In step 915, blacklisted access points are monitored for, and upon detection they may be blocked through RF countermeasures and location may be triangulated. Blacklisted access points are access points located in the Blacklisted Device List 522, and may signify a security threat.

In step 916, authenticated devices on the Wireless Network 110 that have mismatched MAC address, user ID or VLAN are monitored for and upon detection such devices are logged off of the network. Devices with mismatched MAC, ID or VLAN may signify a security breach, or an incorrect authentication of a User Device 311. By removing the device from the network the risk of inappropriate data sharing is limited.

In step 917, unencrypted traffic on the Wireless Network 110 is monitored for and upon detection offending device is logged off of the network. A device transmitting unencrypted data runs the risk of having the data viewed by unauthorized users. By logging off a device transmitting unencrypted data on the network this risk is limited.

In step 918, non-authenticated User Devices 311 on the network are monitored for and upon detection are logged off of the network. Under normal conditions a device should not gain access to the Wireless Network 110 without authenticating. If a device gains access to the network without authenticating there may be a risk of a security breach by the non-authenticated device. To limit this concern non-authenticated devices found on the Wireless Network 110 are immediately logged off the network.

These security processes are not exhaustive, and additional security processes may be included as required to ensure security and privacy of Wireless Networks 110, User Devices 311 and Private Networks 140.

Figure 9B:
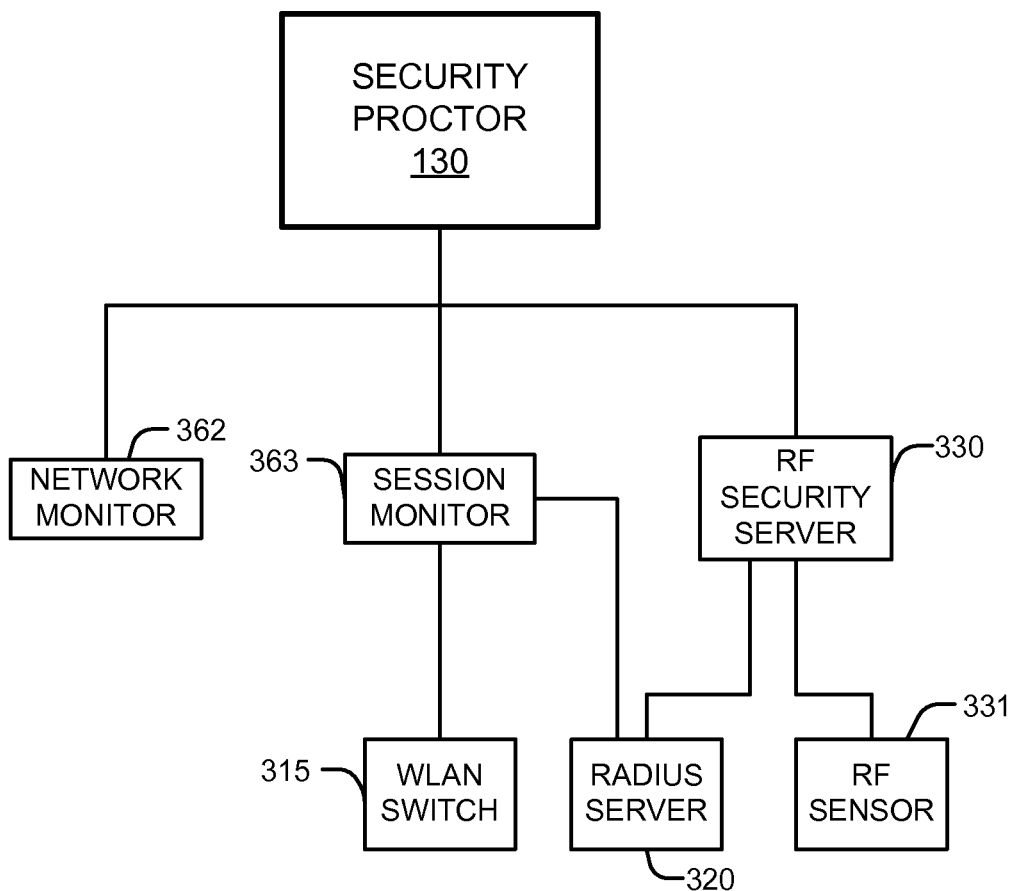
FIG. 9B shows a functional block diagram illustrating the security system for the wireless system of FIG. 1.

FIG. 9B shows a functional block diagram illustrating the connection of RF monitors to logical security information in accordance with an embodiment of the present invention. Security Proctor 130 receives information from the RF Security Server 330, the Session monitor 363 and the Network Monitor 362.

RF Sensors 331 provide information to the RF Security Server 330, about the RF environment. Additionally, logical information from the RADIUS Server 320 is provided to the RF Security Server 330 and the Session Monitor 363. Logical information from the WLAN Switch 315, is provided to the Session Monitor 363.

Together, the information from the RF Security Server 330, the Session monitor 363 and the Network Monitor 362, is scrubbed by security sniffer algorithms to detect possible security threats, and make the appropriate notifications and countermeasures.

Figure 9C:
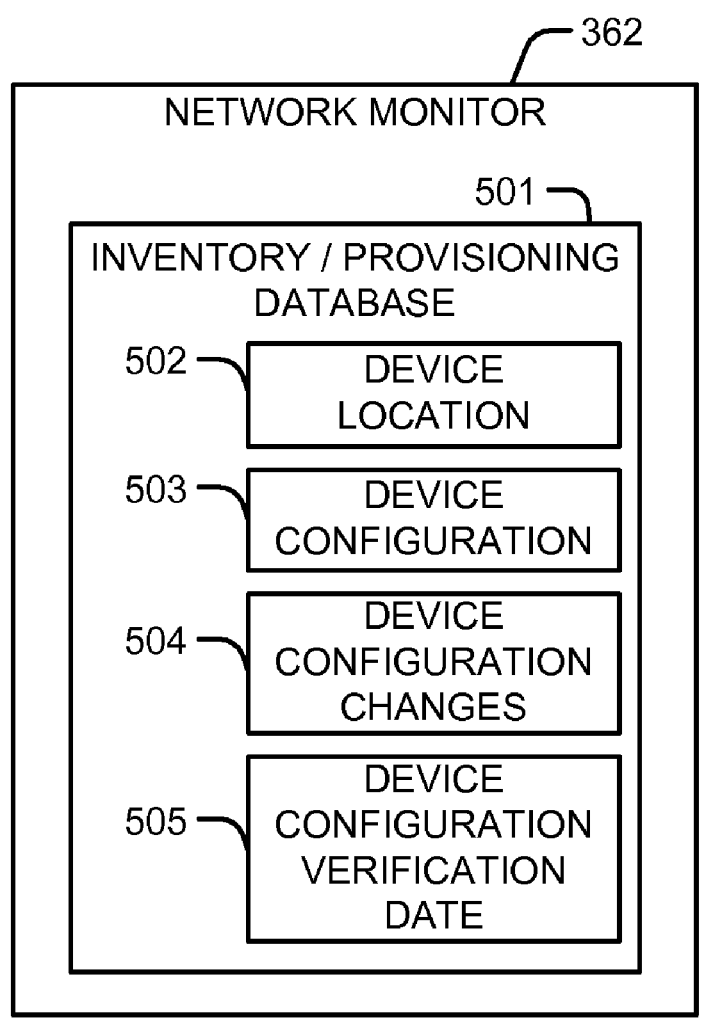
FIG. 9C shows a functional block diagram illustrating the network monitor for the wireless system of FIG. 1.

FIG. 9C shows a functional block diagram illustrating the Network Monitor 362 in accordance with an embodiment of the present invention. Network Monitor 362 utilizes the Inventory/Provisioning Database 501. The Inventory/Provisioning Database 501 keeps track of Device locations 502, Device Configuration 503, Changes made to Device Configuration 504, and Dates of Device Audits for Verification of Configuration 505. The Network Monitor 362 also continuously tracks the uptime, reachability and performance status of all network devices. In addition, Network Monitor 362 polls all network devices for SNMP information, which is stored on a database.

Figure 9D:
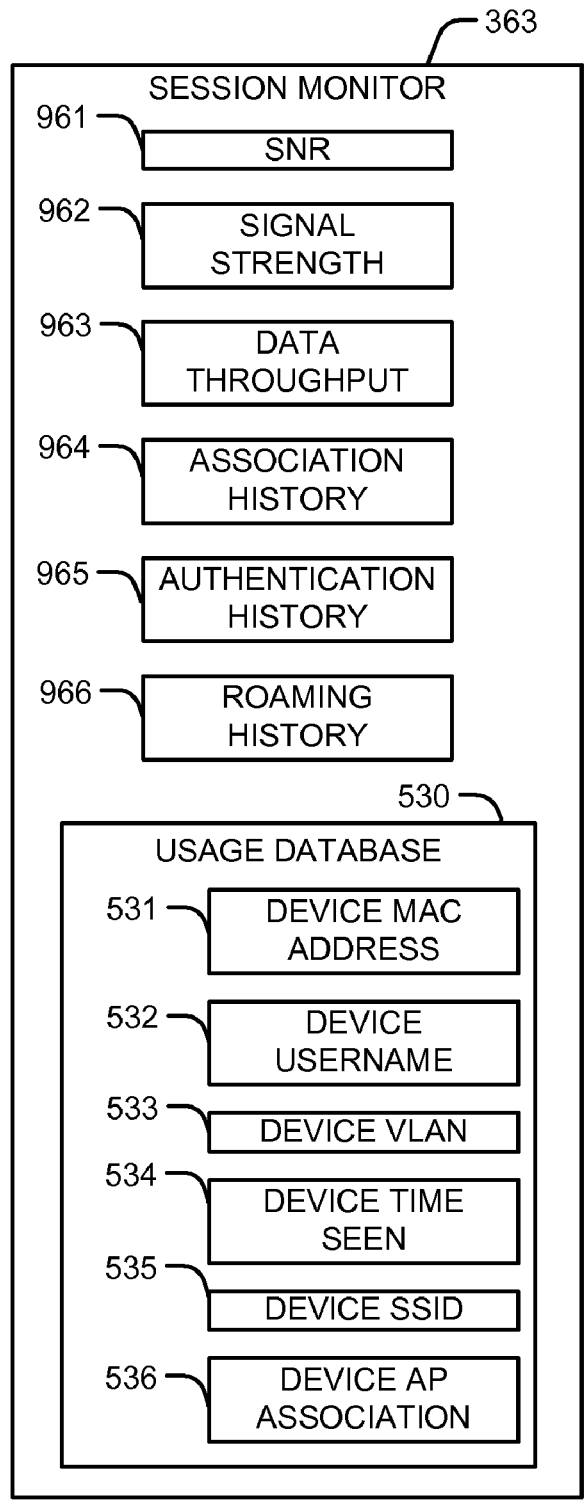
FIG. 9D shows a functional block diagram illustrating the session monitor for the wireless system of FIG. 1.

FIG. 9D shows a functional block diagram illustrating the Session Monitor 363 in accordance with an embodiment of the present invention. Session Monitor 363 utilizes the Usage Database 530. Usage Database 530 tracks all User Device 311 usage with, but not limited to: Device MAC Address 531, Device Username 532, Device VLAN 533, Time Seen of Device on the Network 534, Device SSID 535, and Device Associations with AP 536. Session Monitor 363 also monitors the SNR (Signal to Noise Ratio) 961 of each device, Signal Strength 962 of each device, Data Throughput 963, Association History 964 of each device, Authentication History 965 of each device, and Roaming History 966 of each device. In one embodiment, the Session Monitor 363 generates visual alerts when certain performance triggers are met. Examples of triggers are SNR readings, data throughputs, multiple MAC addresses, multiple failed login attempts, and excessive roaming.

Figure 9E:
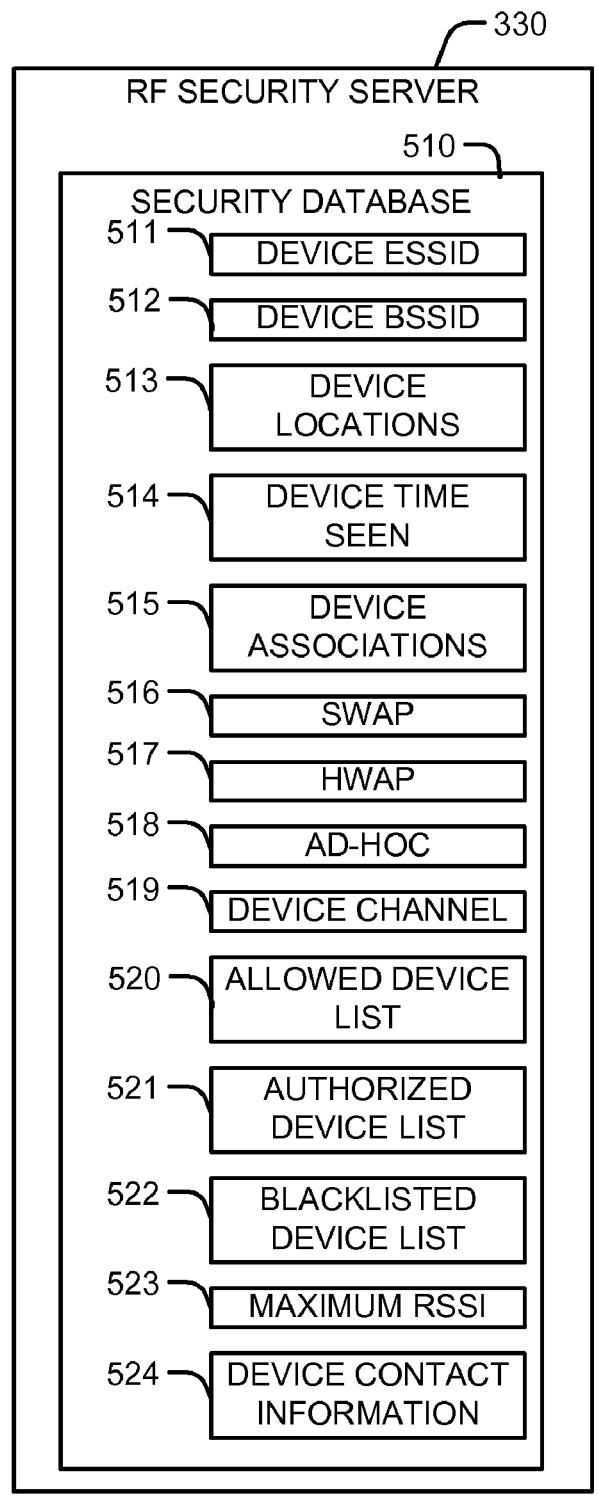
FIG. 9E shows a functional block diagram illustrating the radio frequency security server for the wireless system of FIG. 1.

FIG. 9E shows a functional block diagram illustrating the Radio Frequency Security Server 330 in accordance with an embodiment of the present invention. RF Security Server 330 contains the Security Database 510. Security Database 510 is maintained to track information on all devices on the network including, but not limited to: Device ESSID 511, Device BSSID 512, Device Location 513, Time Seen of Device on the Network 514, Device Associations 515, SWAP 516, HWAP 517, AD-HOC Devices 518, Allowed Device list 520, Authorized Device list 521, Blacklisted Devices 522, Device Channel 519, Max RSSI 523 and Device Contact Information 524.

Figure 10:
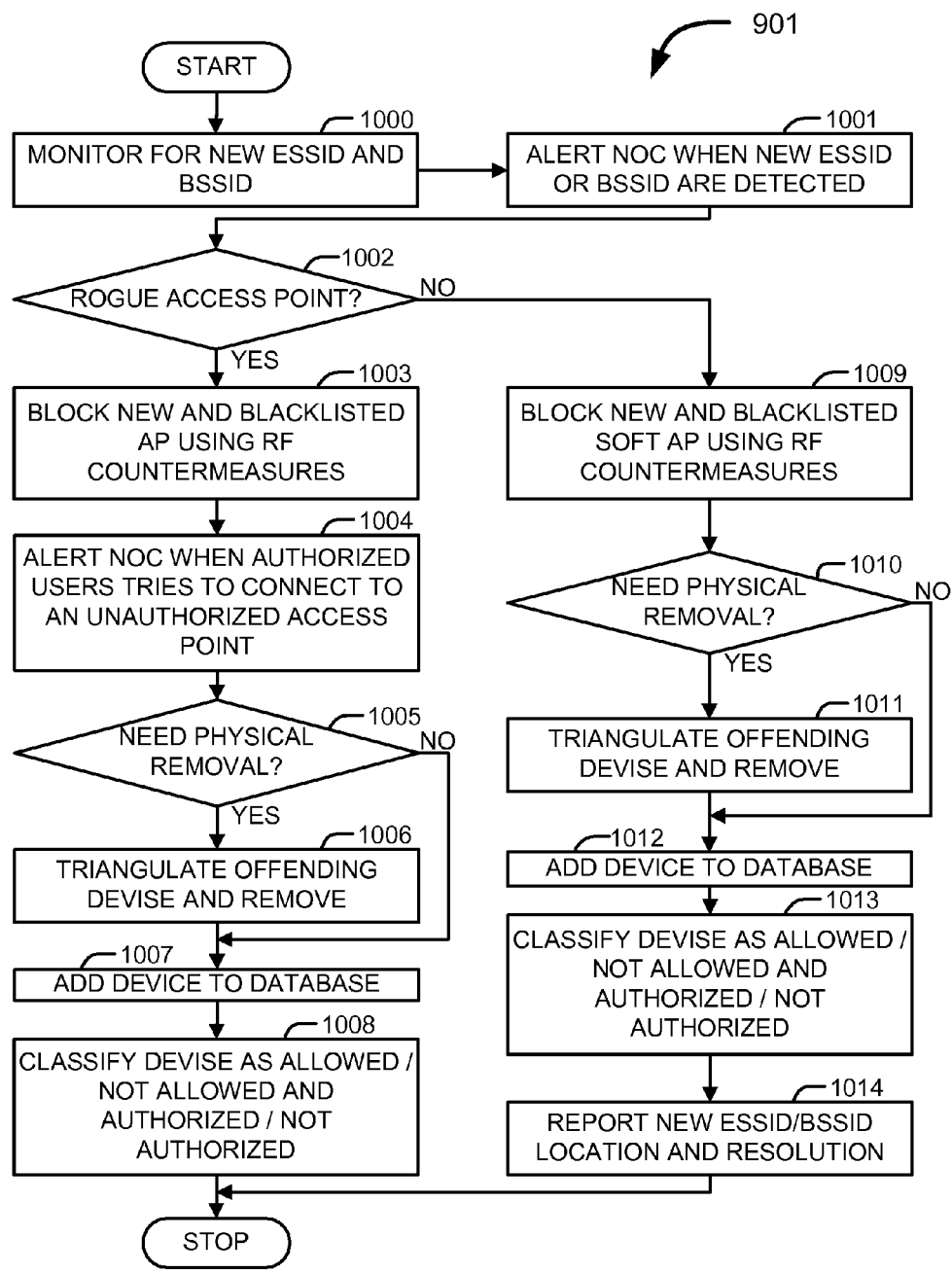
FIG. 10 shows a flow chart illustrating the process of monitoring and providing countermeasures for unauthorized access points for the wireless system of FIG. 1.

FIG. 10 shows a flow chart 901 illustrating the process of monitoring and providing countermeasures for unauthorized access points in accordance with an embodiment of the present invention. In this process, new ESSID or BSSID are monitored for, in the first step 1000. ESSID and BSSID monitoring is performed by RF Sensor 331 which detect and observe the RF environment within the Wireless Network 110 coverage area 301.

In step 1001, upon detection of new ESSID or BSSID the NOC is alerted with the new ESSID or BSSID, RSSI, Channel, time of detection, SWAP/HWAP, associated users, Private Network connectivity, and triangulated location. If the detected new ESSID or BSSID is a rogue access point, the new Access Point and any blacklisted Access Points are blocked using radio frequency countermeasures, in step 1003. RF countermeasures are performed by the RF monitoring system. In step 1004, the NOC is alerted when an authorized users tries to couple to an unauthorized access point. If the rogue access point needs physical removal, then the offending device location is triangulated and is removed in step 1006. In the next step 1007, the rogue access point is added to a security database. Subsequently, in step 1008, the device is classified as an allowed device or a not allowed device, and as either an authorized or not authorized device.

Otherwise, in step 1005, if the rogue access point does not require physical removal then the process can immediately proceed to step 1007, where the rogue access point is added to a security database. Subsequently, in step 1008, the device is classified as an allowed device or a not allowed device, and as either an authorized or not authorized device.

Additionally, in step 1002, if the offending device is not a rogue access point, then the new soft access point, and any blacklisted soft access points, is blocked using radio frequency countermeasures in step 1009. If the soft access point requires physical removal, then the offending devise location is triangulated and is removed in step 1011. In step 1012, the soft access point is added to a security database. In step 1013, the soft access point is classified as either allowed or not allowed and as either authorized or not authorized. In step 1014, the new ESSID or BSSID location and resolution of the ESSID or BSSID is reported.

Otherwise, in step 1010, if the soft access point does not require physical removal then the process can immediately proceed to step 1012, where the soft access point is added to a security database. Subsequently, in step 1013, the device is classified as an allowed device or a not allowed device, and as either an authorized or not authorized device. Then, in step 1014, the new ESSID or BSSID location and resolution of the ESSID or BSSID is reported.

Figure 11:
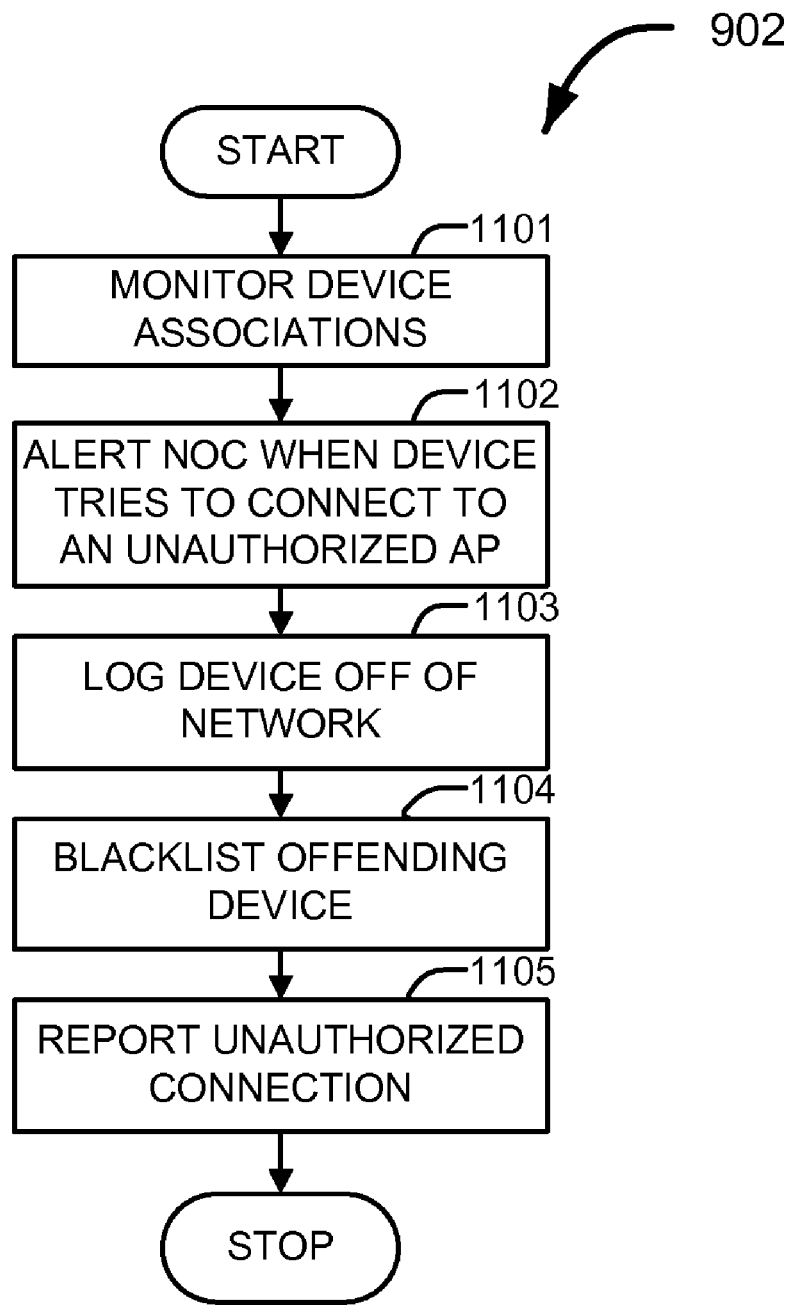
FIG. 11 shows a flow chart illustrating the process of monitoring and providing countermeasures for malicious device associations for the wireless system of FIG. 1.

FIG. 11 shows a flow chart 902 illustrating the process of monitoring and providing countermeasures for malicious device associations in accordance with an embodiment of the present invention. In this process, User Device 311 associations are monitored in the first step 1101. Active associations of BSSID, ESSID, MAC address, time associated and location are monitored. Monitoring is performed by RF Sensors 331 which detect and observe the RF environment within the Wireless Network 110 coverage area 301.

In step 1102, NOC 360 is alerted when a User Device 311 tries to couple to an unauthorized access point. The device is identified by MAC address.

In step 1103, offending User Device 311 is logged off of the Wireless Network 110. Additional countermeasures may be instated as required.

In step 1104, offending User Device 311 is blacklisted.

In step 1105, unauthorized connection by User Devices 311 to unauthorized access points is reported with BSSID, ESSID, MAC address, time associated and location of associations. By limiting User Device 311 associations to management Access Points 312, the User Device 311 is protected from sharing sensitive information with a potentially harmful third party.

Figure 12:
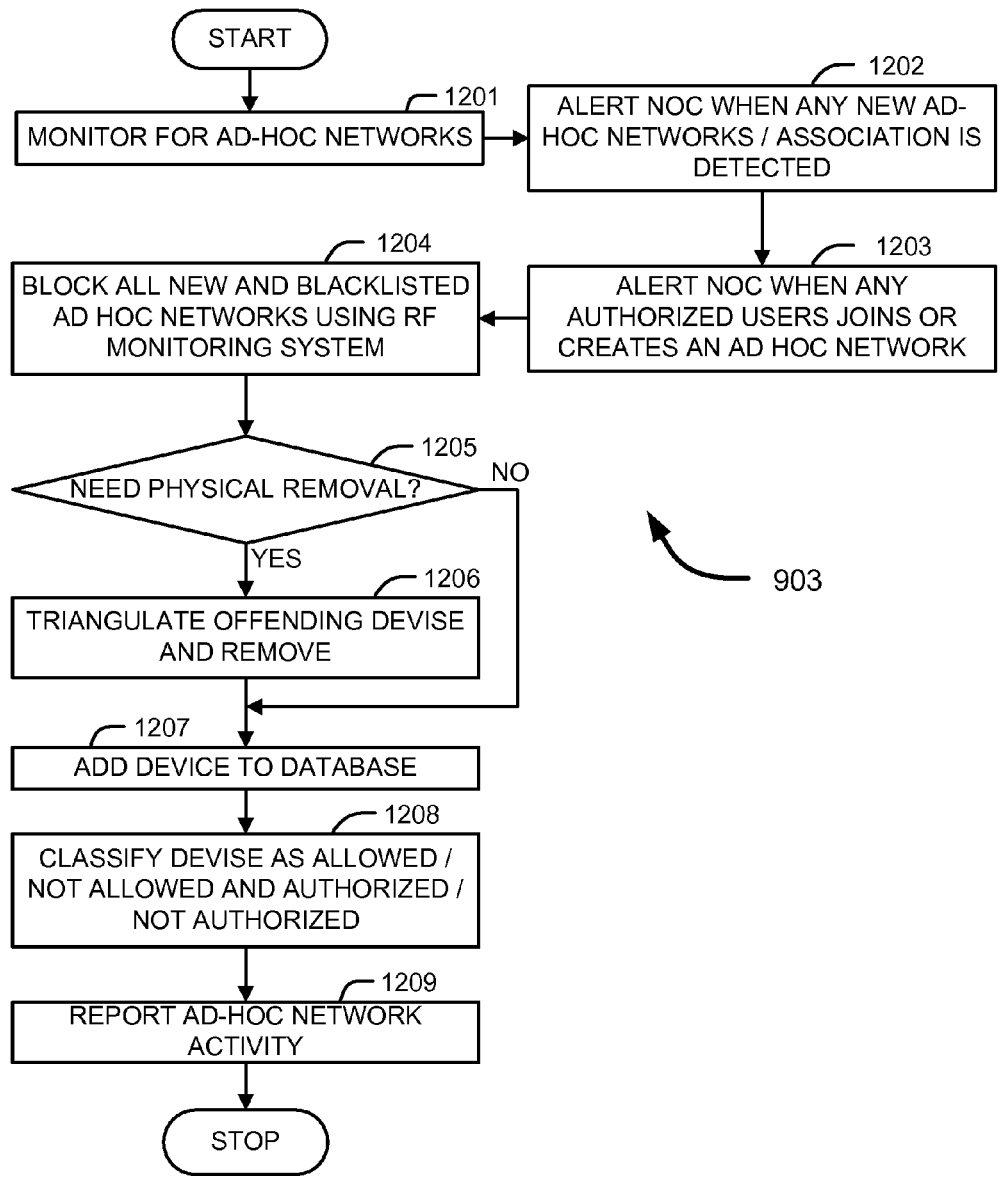
FIG. 12 shows a flow chart illustrating the process of monitoring and providing countermeasures for AD-HOC networks for the wireless system of FIG. 1.

FIG. 12 shows a flow chart 903 illustrating the process of monitoring and providing countermeasures for AD-HOC networks in accordance with an embodiment of the present invention. Information technology training and end user education on client configuration is the best practice to prevent AD-HOC networks. In this process, AD-HOC networks are monitored for in the first step 1301. No AD-HOC network can be authorized for connection by User Devices 311.

In step 1202, NOC 360 is alerted when any new AD-HOC networks or association by a device to an AD-HOC network are detected.

In step 1203, NOC 360 is alerted when any authorized User Device 311 joins or creates an AD-HOC network.

In step 1204, all new and blacklisted AD-HOC networks are blocked using radio frequency countermeasures. RF countermeasures are performed by the RF monitoring system.

If the AD-HOC network requires physical removal, then the offending device's location is triangulated and the AD-HOC network is removed, in step 1206. Then in step 1207, offending device responsible for the AD-HOC network is added to the security database. In step 1208, the device is classified as either allowed or not allowed and as either authorized or not authorized. In step 1209, AD-HOC network activity is reported.

Otherwise, in step 1205, if the AD-HOC network does not need to be physically removed, then the offending devise responsible for the AD-HOC network is added to a security database, in step 1207. Subsequently, in step 1208, the device is classified as either allowed or not allowed and as either authorized or not authorized. In step 1209, AD-HOC network activity is reported.

In some embodiment a client configuration manager may be utilized to allow control of User Device 311 configurations to limit the creation and association with AD-HOC networks.

Figure 13:
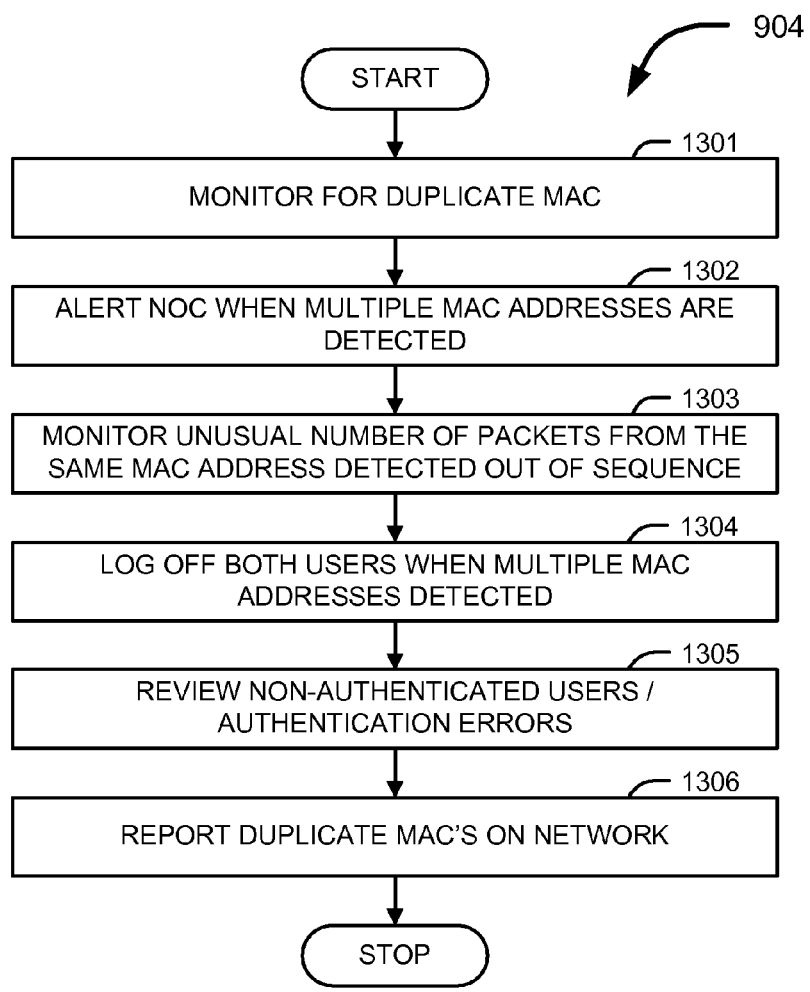
FIG. 13 shows a flow chart illustrating the process of monitoring and providing countermeasures for MAC spoof attacks for the wireless system of FIG. 1.

FIG. 13 shows a flow chart 904 illustrating the process of monitoring and providing countermeasures for MAC spoof attacks in accordance with an embodiment of the present invention. MAC addresses are not the sole authentication method utilized in order to reduce risk of security breach. Vulnerability to MAC spoofing attacks may be reduced by utilizing 802.1x protocol. In this process, duplicate MAC addresses are monitored for, in step 1301.

In step 1302, NOC 360 is alerted when multiple MAC addresses are detected.

In step 1303, unusual numbers of packets from the same MAC address detected out of sequence are monitored, since this may provide detection of a spoofed MAC address.

In step 1304, all User Devices 311 purporting the same MAC address are logged off the network when detected.

In step 1305, a review of non-authenticated users and authentication errors is performed. Review of authentication records may provide insight into how duplicate MAC addresses gained access to the network and can lead to enhanced security measures.

In step 1306, duplicate MAC addresses on the network are reported to the tenant.

Figure 14:
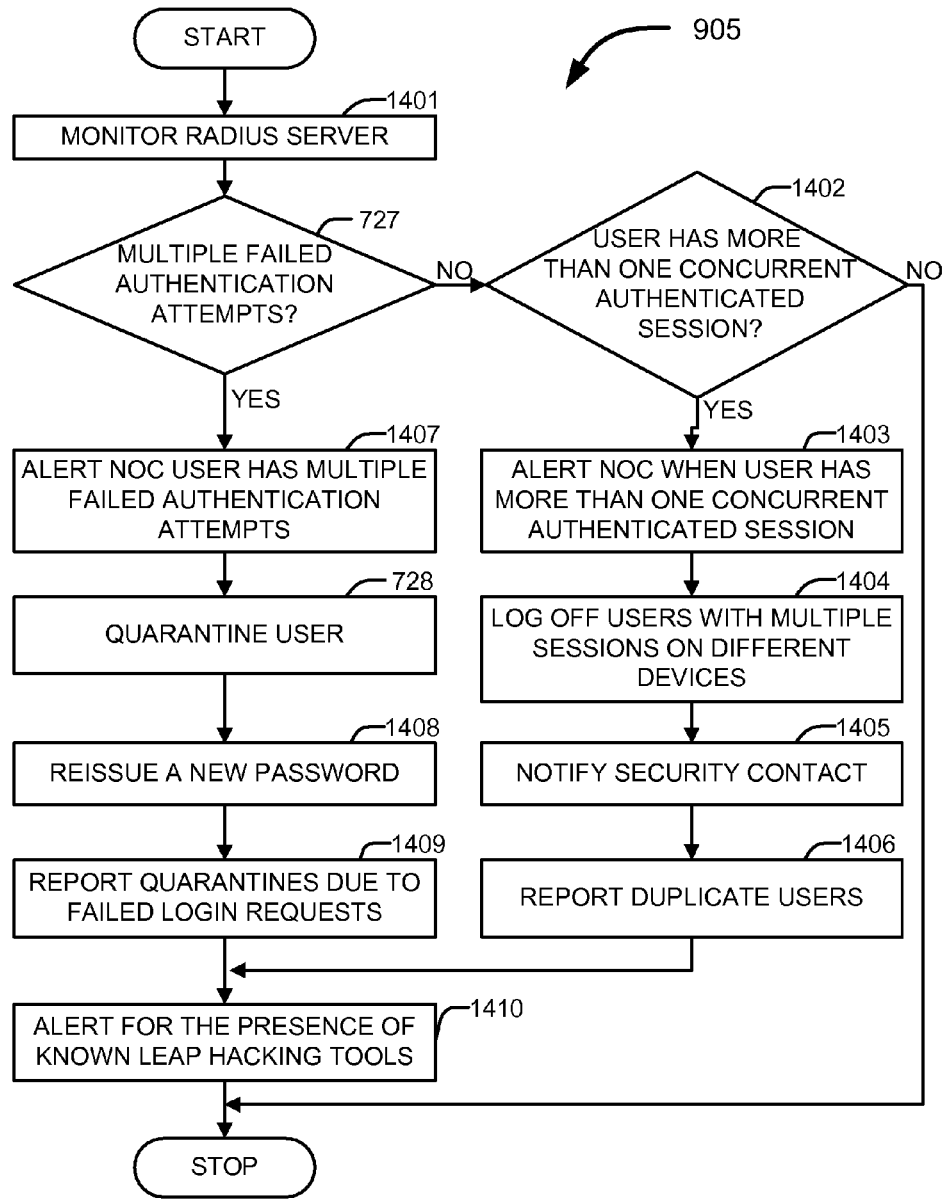
FIG. 14 shows a flow chart illustrating the process of monitoring and providing countermeasures for authorization hack attempts for the wireless system of FIG. 1.

FIG. 14 shows a flow chart 905 illustrating the process of monitoring and providing countermeasures for authorization hack attempts in accordance with an embodiment of the present invention. In this process the RADIUS server 320 is monitored, in step 1401. Monitoring is for the use of tools such as THC-LEAPCracker or other authentication hacking tools. The use of certificate or token-based authentication reduces vulnerability to authentication hacks and may be used. Additionally, username and passwords can be locked to a specific MAC address.

If a User Device 311 has multiple failed authentication attempts, then NOC is alerted in step 1407. Then in step 728, User Device 311 is quarantined. In step 1408, a new password is reissued to the User Device 311. In step 1409, quarantines due to failed login requests are reported to the customer security contact. In step 1410, NOC is alerted for the presence of known LEAP hacking tools. Quarantining User Device 311 limits the vulnerability to authentication hacks. In some embodiment device quarantine may be removed by an account administrator.

Otherwise, in step 727, if User Device 311 does not have multiple failed authentication attempts, but user has more than one concurrent authenticated session on different devices, then NOC 360 is alerted of the concurrent authenticated sessions, in step 1403. Then, in step 1404, users with multiple concurrent sessions on different devices are logged off the network. In step 1405, a security contact at the location of the devices that have the concurrent authenticated sessions is alerted. The security contact may then physically intervene to prevent security leak. In step 1406, duplicate users with multiple concurrent sessions are reported. In step 1410, NOC 360 is alerted for the presence of known LEAP hacking tools.

Figure 15:
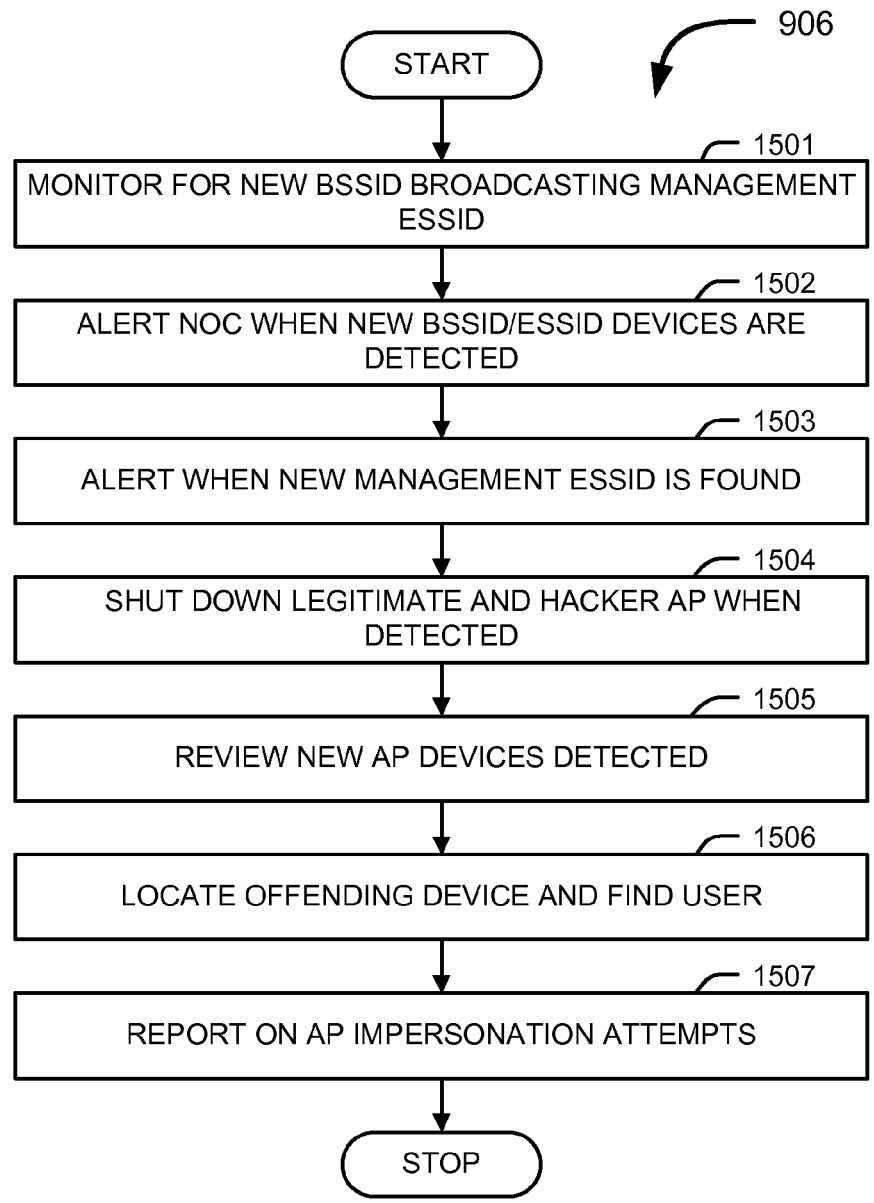
FIG. 15 shows a flow chart illustrating the process of monitoring and providing countermeasures for access point impersonation for the wireless system of FIG. 1.

FIG. 15 shows a flow chart 906 illustrating the process of monitoring and providing countermeasures for Access Point 312 impersonation in accordance with an embodiment of the present invention. Access Point 312 impersonation is a paramount security concern. In this process, new BSSID broadcasting management ESSID are monitored for in step 1501.

In step 1502, NOC is alerted when new BSSID/ESSID devices are detected.

In step 1503, NOC is alerted when new management ESSID is detected.

In step 1504, both legitimate and hacker access points are shut down when they are detected. By shutting down the access point any security risk is limited.

In step 1505, new access point devices are reviewed to determine the extent of a security risk they pose.

In step 1506, the offending device is located and the user of the device is found.

In step 1507, Access Point 312 impersonation attempts are reported.

Figure 16:
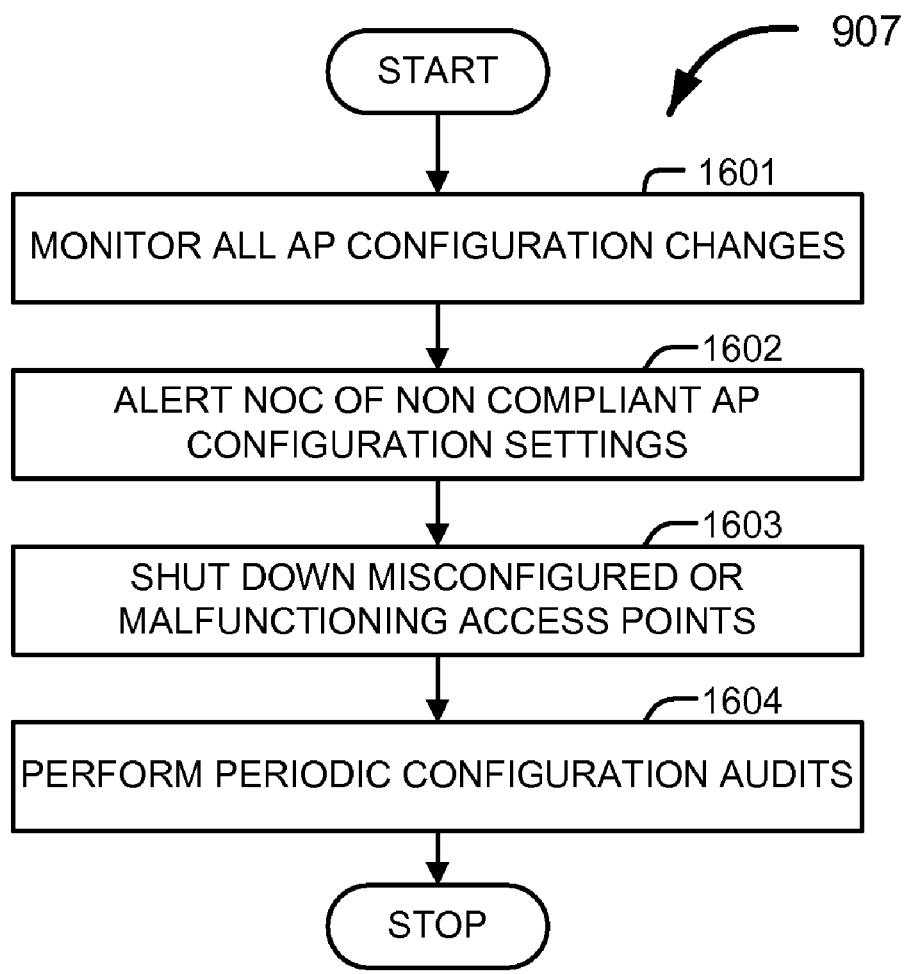
FIG. 16 shows a flow chart illustrating the process of monitoring and providing countermeasures for misconfigured access points for the wireless system of FIG. 1.

FIG. 16 shows a flow chart 907 illustrating the process of monitoring and providing countermeasures for misconfigured Access Points 312 in accordance with an embodiment of the present invention. In this process, all Access Point 312 configuration changes are monitored, in step 1601.

In step 1602, NOC is alerted of non compliant Access Point 312 configuration settings.

In step 1603, misconfigured or malfunctioning Access Points 312 are shut down.

In step 1604, periodic configuration audits are performed to ensure that all configurations are compliant and that all Access Points 312 are functioning properly.

Figure 17:
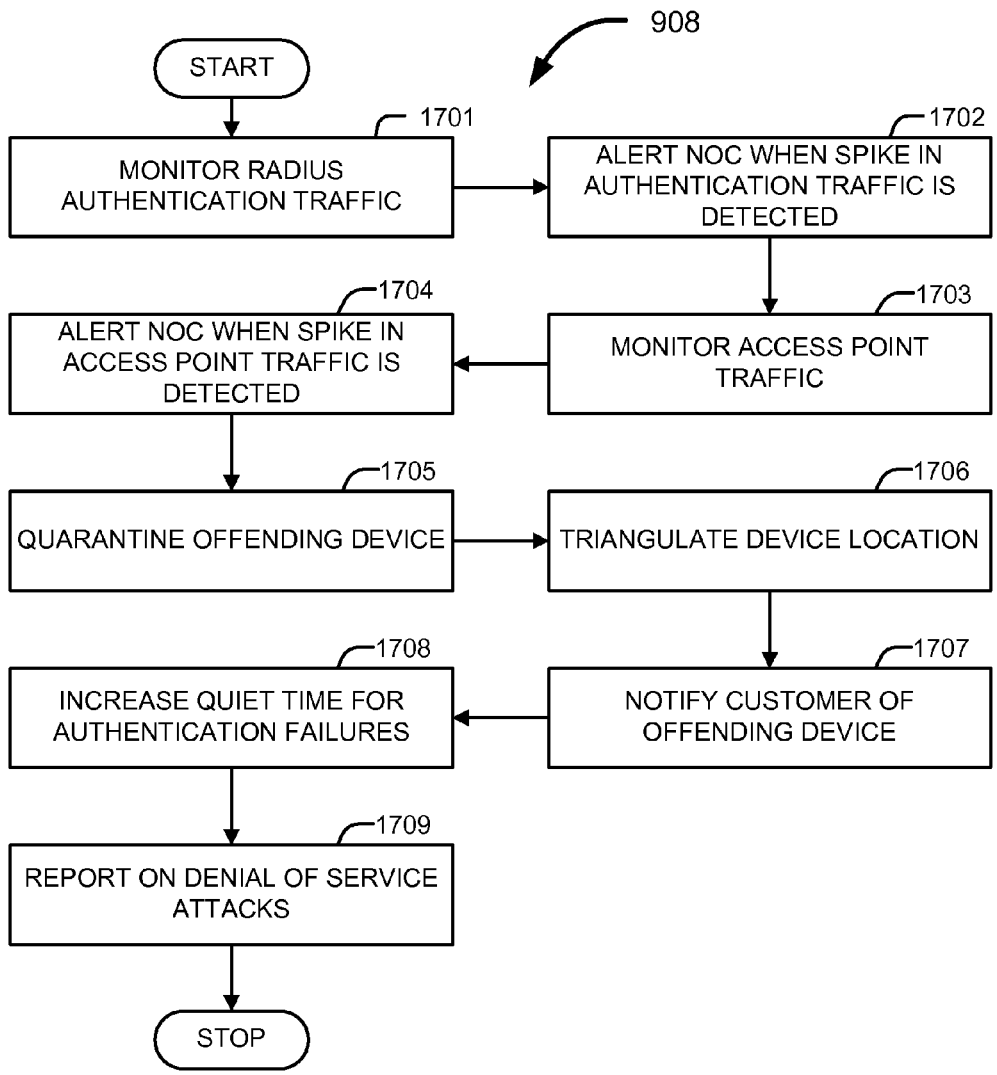
FIG. 17 shows a flow chart illustrating the process of monitoring and providing countermeasures for access point flood attacks for the wireless system of FIG. 1.

FIG. 17 shows a flow chart 908 illustrating the process of monitoring and providing countermeasures for Access Point 312 Flood attacks in accordance with an embodiment of the present invention. In this process RADIUS authentication traffic is monitored, in step 1701.

In step 1702, NOC is alerted when there is a spike in authentication traffic detected.

In step 1703, Access Point 312 traffic is monitored.

In step, 1704 NOC is alerted when there is a spike in Access Point 312 traffic detected.

In step 1706, offending device responsible for the spike in traffic is quarantined. By quarantining the device, the traffic from that device is eliminated thereby preventing a denial of service.

In step 1707, device responsible for the spike in traffic location is triangulated.

In step 1707, Tenant is notified of offending device responsible for the spike in traffic.

In step 1708, quiet time for authentication failures is increased. Authentication traffic may be one of the most resource consuming actions engaged in by a device on the Wireless network 110. By extending quiet time after a failed authentication, the device is prevented from continuously and relentlessly attempting to authenticate and leading to an overburdening of network resources.

In step 1709, excessive Access Point 312 usage is reported on a denial of service attacks report.

Figure 18:
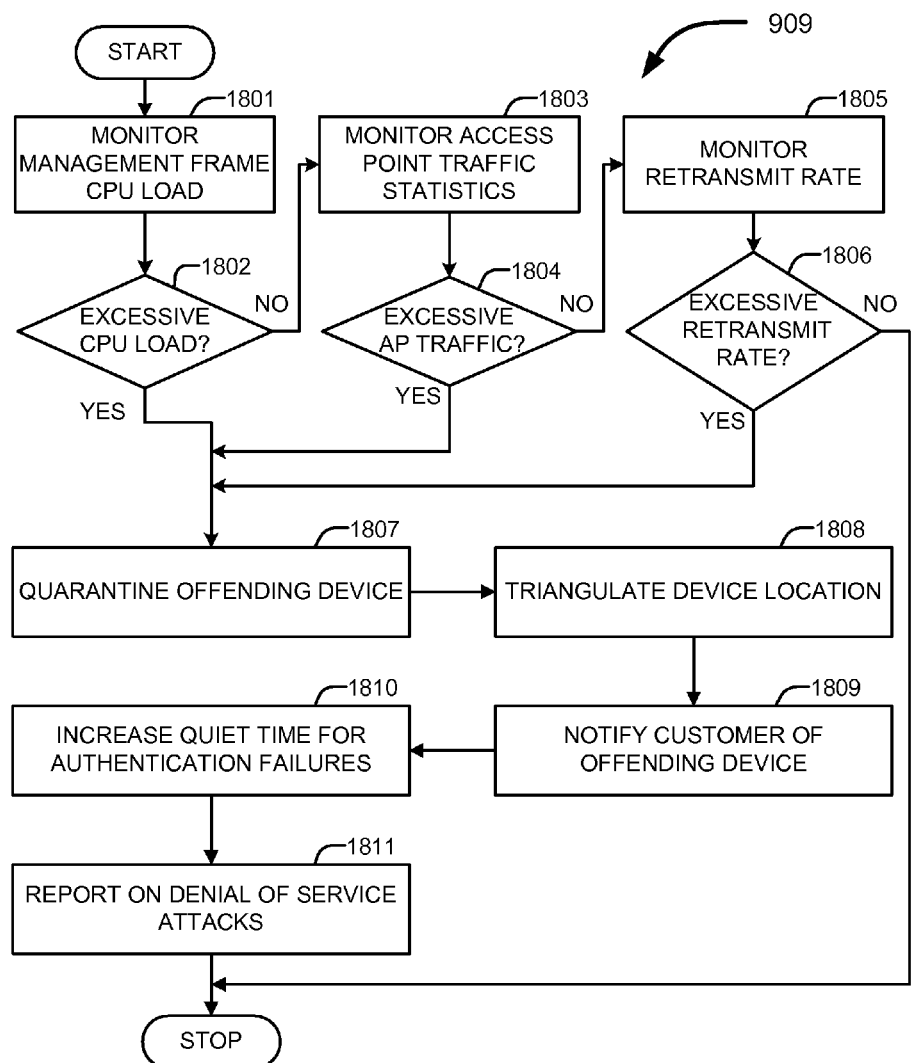
FIG. 18 shows a flow chart illustrating the process of monitoring and providing countermeasures for management frame flood attacks for the wireless system of FIG. 1.

FIG. 18 shows a flow chart 909 illustrating the process of monitoring and providing countermeasures for management frame flood attacks in accordance with an embodiment of the present invention. In this process management frame CPU load is monitored in step 1801. If excessive CPU load is detected then offending device responsible for the spike in CPU load is quarantined in step 1807. In step 1808, device location is triangulated. In step 1809, tenant is notified of offending device. In step 1810, quiet time for authentication failures is increased. In step 1811, excessive CPU load is reported on a denial of service attacks report.

Otherwise, in step 1802, if CPU load is not excessive, then Access Point 312 traffic statistics are monitored in step 1803. If there is excessive Access Point 312 traffic then offending device responsible for the spike in traffic is quarantined in step 1807. In step 1808, device location is triangulated. In step 1809, tenant is notified of offending device. In step 1810, quiet time for authentication failures is increased. In step 1811, excessive Access Point 312 traffic is reported on a denial of service attacks report.

Alternatively, in step 1804, if Access Point 312 traffic is not excessive, then retransmit rate is monitored in step 1805. If there is an excessive retransmit rate, then offending device responsible for the increase in retransmit rate is quarantined in step 1807. In step 1808, device location is triangulated. In step 1809, tenant is notified of offending device. In step 1810, quiet time for authentication failures is increased. In step 1811, excessive retransmit rate is reported on a denial of service attacks report.

Figure 19:
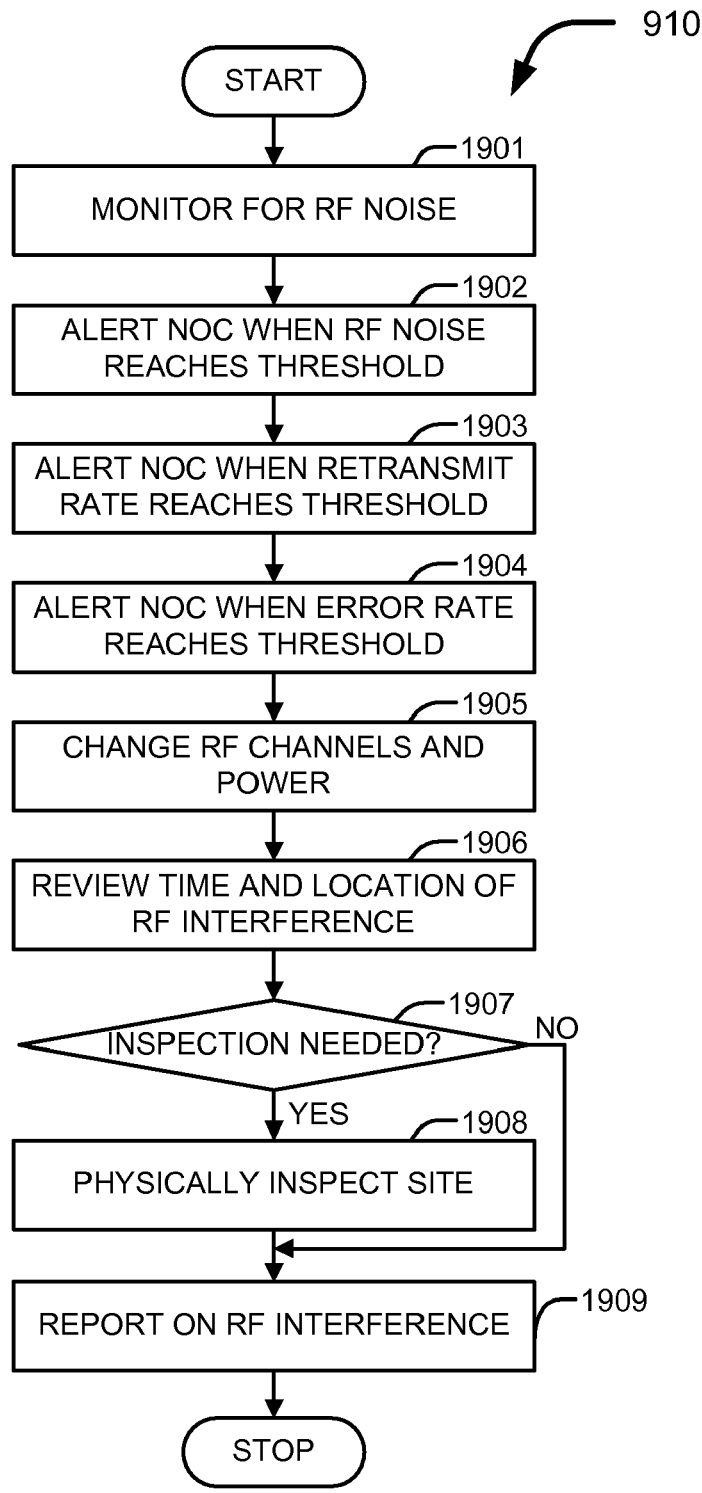
FIG. 19 shows a flow chart illustrating the process of monitoring and providing countermeasures for radio frequency jamming attacks for the wireless system of FIG. 1.

FIG. 19 shows a flow chart 910 illustrating the process of monitoring and providing countermeasures for radio frequency jamming attacks in accordance with an embodiment of the present invention. In this process radio frequency noise is monitored in step 1901.

In step 1902, NOC 360 is alerted when radio frequency noise reaches a threshold. Radio frequency noise threshold may be set at varying levels depending on location specific factors including the environment and network performance.

In step 1903, NOC 360 is alerted when retransmit rate reaches a threshold. As with radio frequency noise threshold, retransmit rate thresholds may be set at varying levels depending on location specific factors including the environment and network performance.

In step 1904, NOC 360 is alerted when error rates reaches a threshold. Error rates include, but are not limited to, CRC error and PHY error rates, as is known by those skilled in the art. As with frequency noise threshold and retransmit rate threshold, error rate thresholds may be set at varying levels depending on location specific factors including the environment and network performance.

In step 1905, radio frequency channels are changed and power levels are altered to overcome the radio frequency interference.

In step 1906, time and location of radio frequency interference is reviewed. If an inspection is required, then the site is physically inspected in step 1908. Site inspection, if required, may result in locating and removing producers of excessive radio frequency noise, relocation of Access Points 312, addition or removal of Access Points 312 or any other site alteration.

In step 1909 radio frequency interference is reported.

Otherwise, if in step 1907 an inspection of the site is not required then radio frequency interference is reported, in step 1909.

Figure 20:
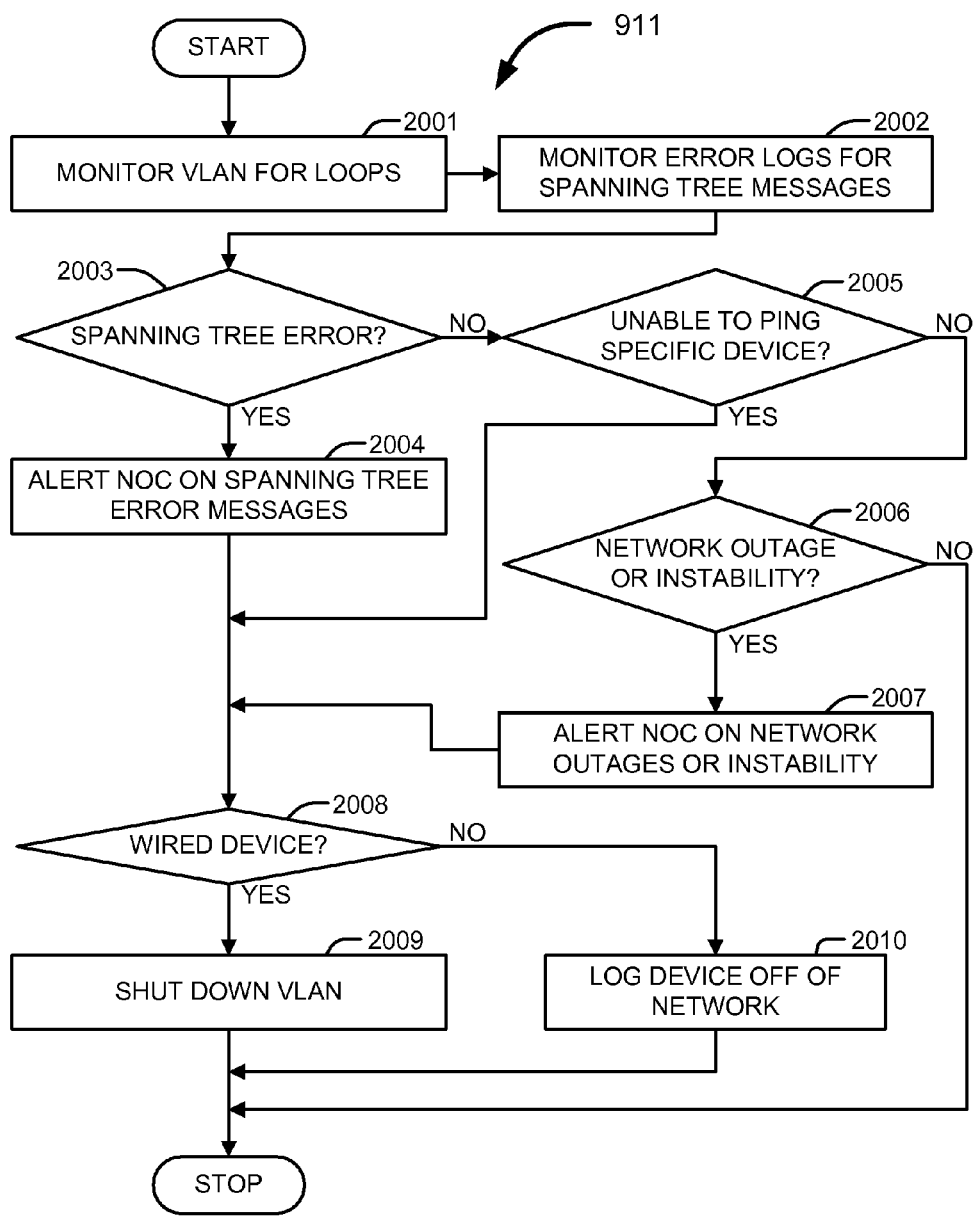
FIG. 20 shows a flow chart illustrating the process of monitoring and providing countermeasures for bridged networks for the wireless system of FIG. 1.

FIG. 20 shows a flow chart 911 illustrating the process of monitoring and providing countermeasures for bridged networks in accordance with an embodiment of the present invention. In this process VLAN's are monitored for loops in step 2001.

In step 2002, error logs are monitored for spanning tree messages, since spanning trees may be used to identify bridged networks. If a spanning tree error message is detected, then NOC is alerted of the spanning tree error message in step 2004. If the device responsible for the spanning tree error is a wired device then the VLAN associated with that device is shut down, in step 2009, in order to limit security risks or network instability.

Otherwise, if the device responsible for the spanning tree error is not a wired device in step 2008, then the device is logged off of the network, in step 3010, in order to limit security risks or network instability.

Alternatively, if no spanning tree error messages are detected in step 2003, but there is an inability to ping a specific device and if the device is a wired device then the VLAN associated with that device is shut down in step 2009, in order to limit security risks or network instability. Otherwise, if the device that is unable to be pinged is not a wired device in step 2008, then the device is logged off of the network in step 3010.

Alternatively, if no spanning tree error is detected in step 2003 and all devices are able to be pinged in step 2005, but there is a network outage or instability, then NOC is alerted of the network instability or outage in step 2007. If the device responsible for the network instability or outage is a wired device then the VLAN associated with that device is shut down in step 2009.

Otherwise, if the device responsible for the network instability or outage is not a wired device in step 2008, then the device is logged off of the network in step 3010.

Figure 21:
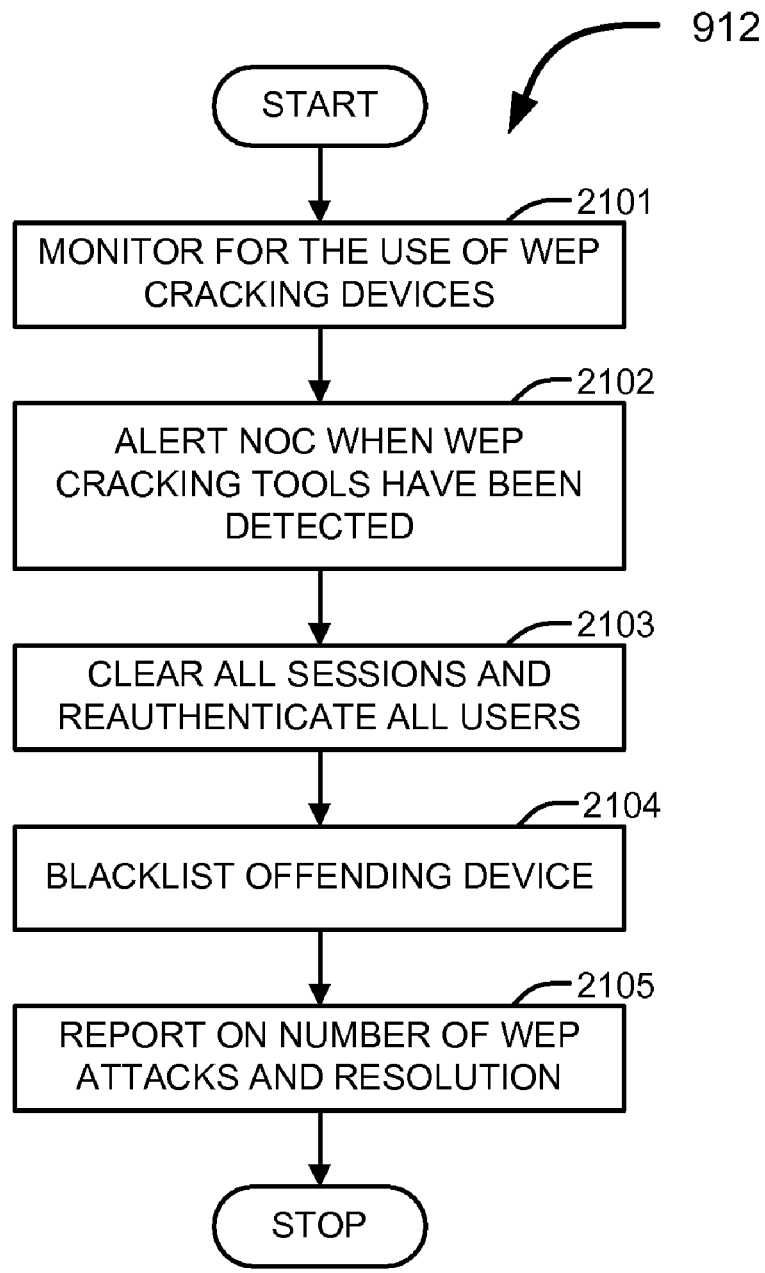
FIG. 21 shows a flow chart illustrating the process of monitoring and providing countermeasures for WEP cracking attacks for the wireless system of FIG. 1.

FIG. 21 shows a flow chart 912 illustrating the process of monitoring and providing countermeasures for WEP cracking attacks in accordance with an embodiment of the present invention. In this process the use of WEP cracking devices is monitored for in step 2101. Examples of such devices include WEPwedgie, WLPCrack, WEP Attack, BSD-Airtools, and AirSnort. Additionally, it is important to note that other acceptable encryption protocols may be utilized, such as Wi-Fi Protected Access (WPA) 1.0 based on the 802.11i Temporal Key Integrity Protocol (TKIP) or WPA 2.0 based on the 802.11i Advanced Encryption Standard (AES), as is well known to those skilled in the art.

In step 2102, NOC 360 is alerted when WEP cracking tools have been detected. NOC may be provided with the offending device's MAC address and location.

In step 2103, upon detection of WEP cracking tools, all User Device 311 authentication sessions are cleared and all user devices are re-authenticated.

In step 2104, offending device using the WLP cracking tool is blacklisted and added to the Security Database 510.

In step 2105, the number of WEP attacks and the resolution of those attacks are reported.

Figure 22:
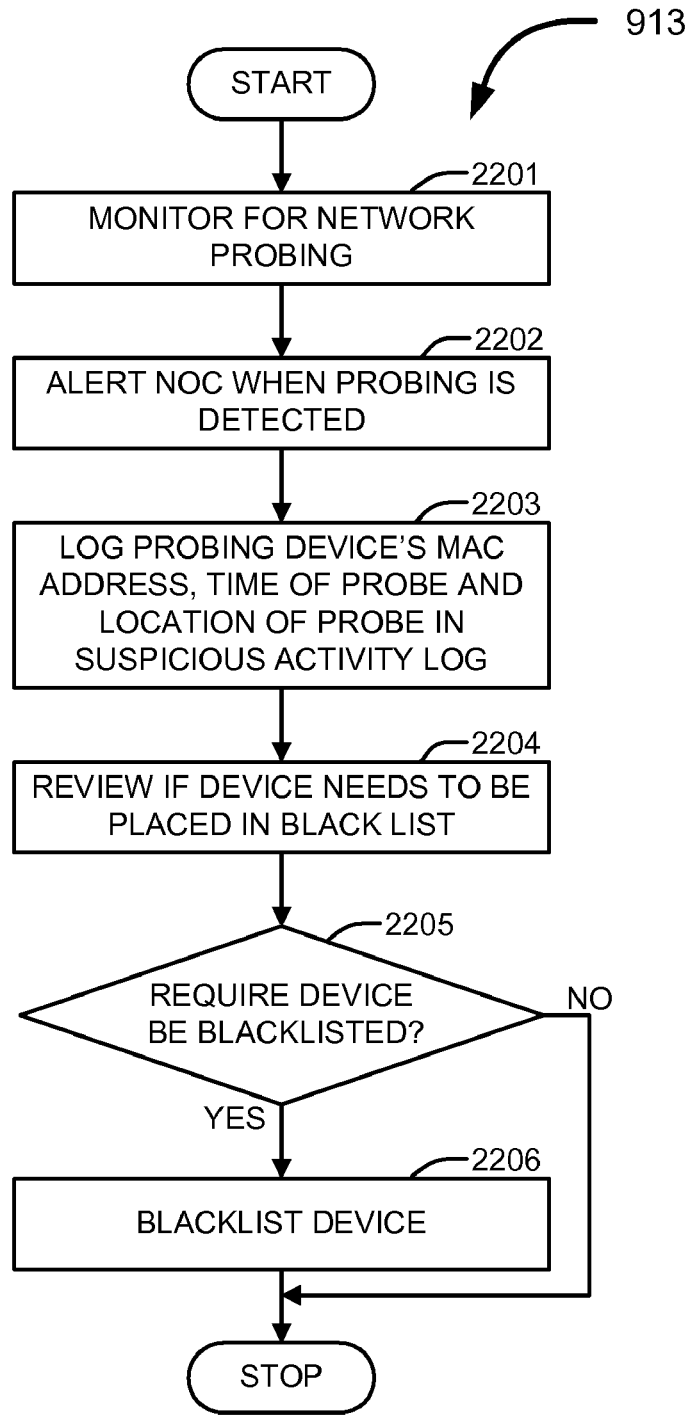
FIG. 22 shows a flow chart illustrating the process of monitoring and providing countermeasures against probing for the wireless system of FIG. 1.

FIG. 22 shows a flow chart 913 illustrating the process of monitoring and providing countermeasures against probing in accordance with an embodiment of the present invention. In this process probing of the network is monitored for in step 2201.

In step 2202, NOC 360 is alerted when probing of the network is detected.

In step 2203, the MAC address, time of probe and location of the probing device is recorded in a suspicious activity log.

In step 2204, review of the device is made to determine in the devices needs to be placed in a blacklist. If the device is required to be blacklisted, then the device may be blacklisted in step 2206.

Figure 23:
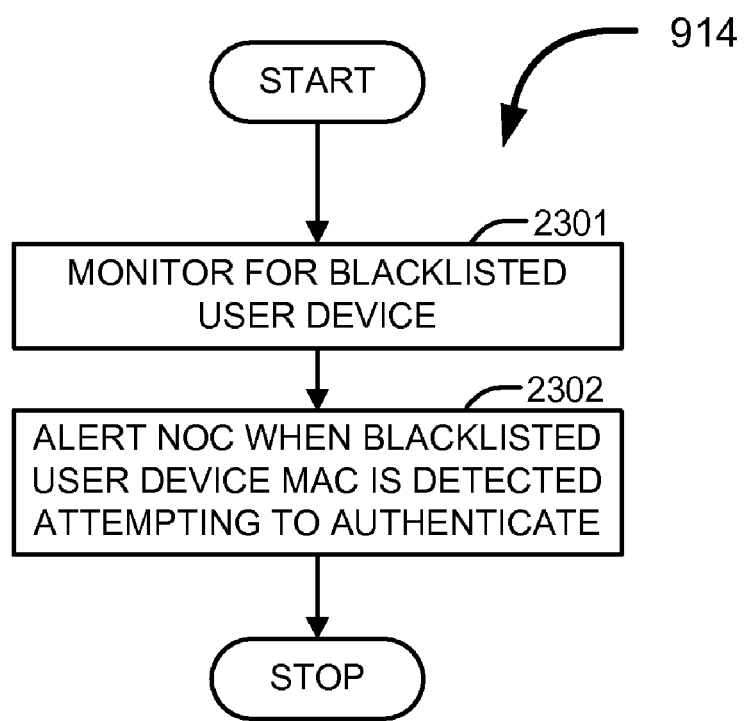
FIG. 23 shows a flow chart illustrating the process of monitoring and providing countermeasures against blacklisted devices for the wireless system of FIG. 1.

FIG. 23 shows a flow chart 914 illustrating the process of monitoring and providing countermeasures against blacklisted devices for the wireless system of FIG. 1. Blacklisted devices are devices entered into the Blacklisted Device List 522. In this process blacklisted devices are monitored for in step 2301.

In step 2302, NOC 360 is alerted when a blacklisted device attempts to authenticate on the Wireless Network 110.

Figure 24:
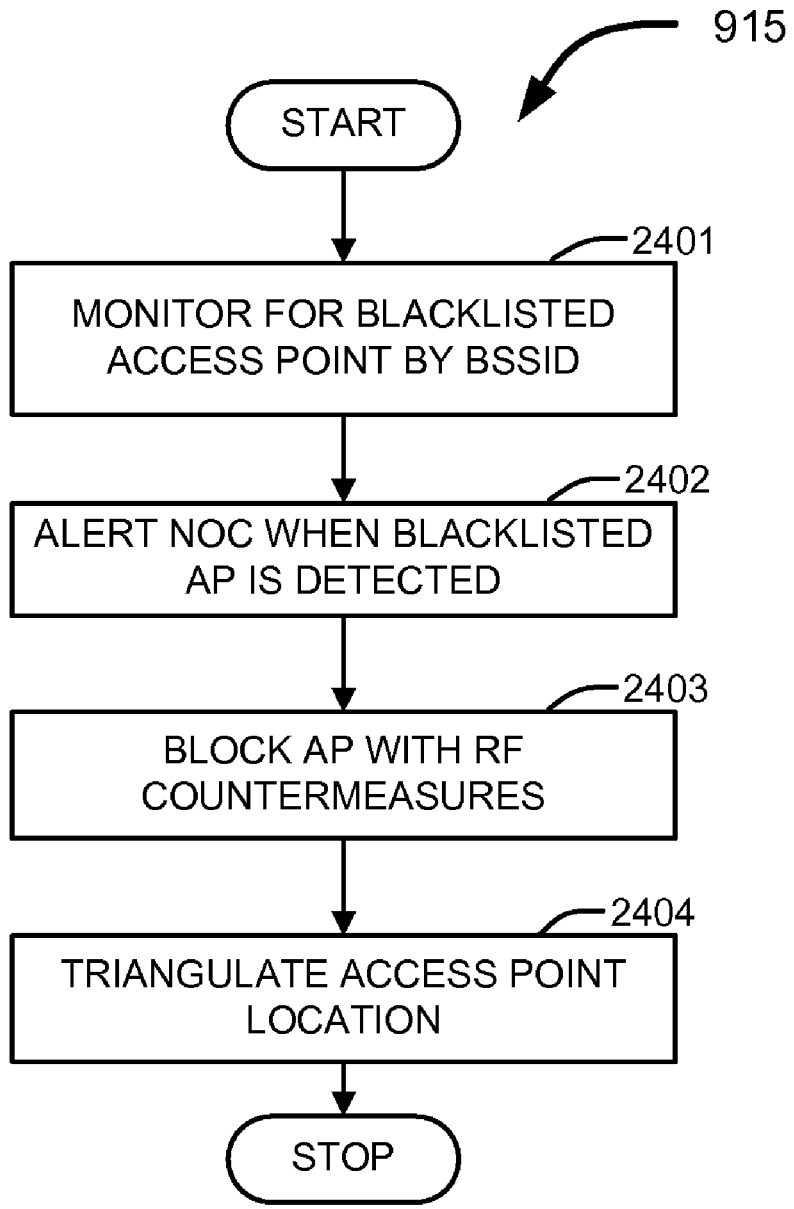
FIG. 24 shows a flow chart illustrating the process of monitoring and providing countermeasures against blacklisted access points for the wireless system of FIG. 1.

FIG. 24 shows a flow chart 915 illustrating the process of monitoring and providing countermeasures against blacklisted Access Points 312 for the wireless system of FIG. 1. Blacklisted access points are access points entered into the Blacklisted Device List 522. In this process blacklisted access points are monitored for by BSSID in step 2401.

In step 2402, NOC 360 is alerted of the presence of the blacklisted access points when they are detected.

In step 2403, blacklisted access points are blocked by RF countermeasures. RF countermeasures may be performed by the RF monitoring system.

In step 2404, blacklisted access points locations are triangulated.

Figure 25:
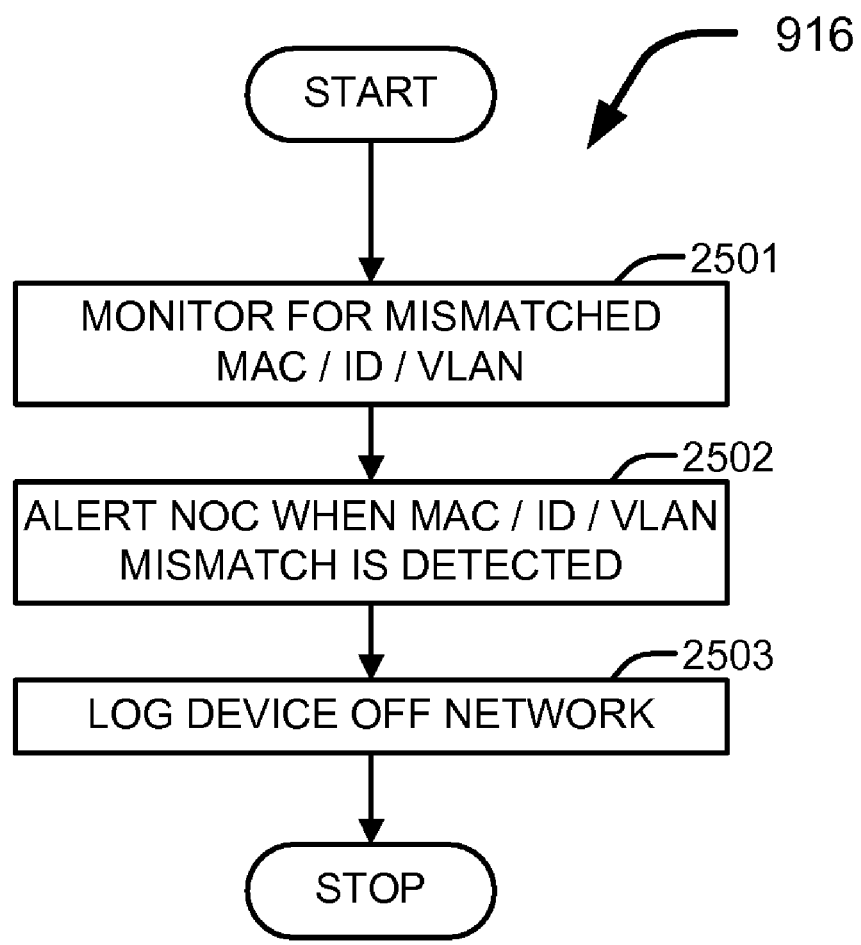
FIG. 25 shows a flow chart illustrating the process of monitoring and providing countermeasures against mismatched MAC address, user ID and VLAN for the wireless system of FIG. 1.

FIG. 25 shows a flow chart 916 illustrating the process of monitoring and providing countermeasures against mismatched MAC address, user ID or VLAN for the wireless system of FIG. 1. In this process authenticated devices are monitored for mismatched MAC address, user ID or VLAN using information from the Session Monitor 363 in step 2501.

In step 2502, NOC is alerted when MAC address, user ID or VLAN mismatch is detected.

In step 2503, the device having the MAC address, user ID or VLAN mismatch is logged off of the Wireless Network 110.

Figure 26:
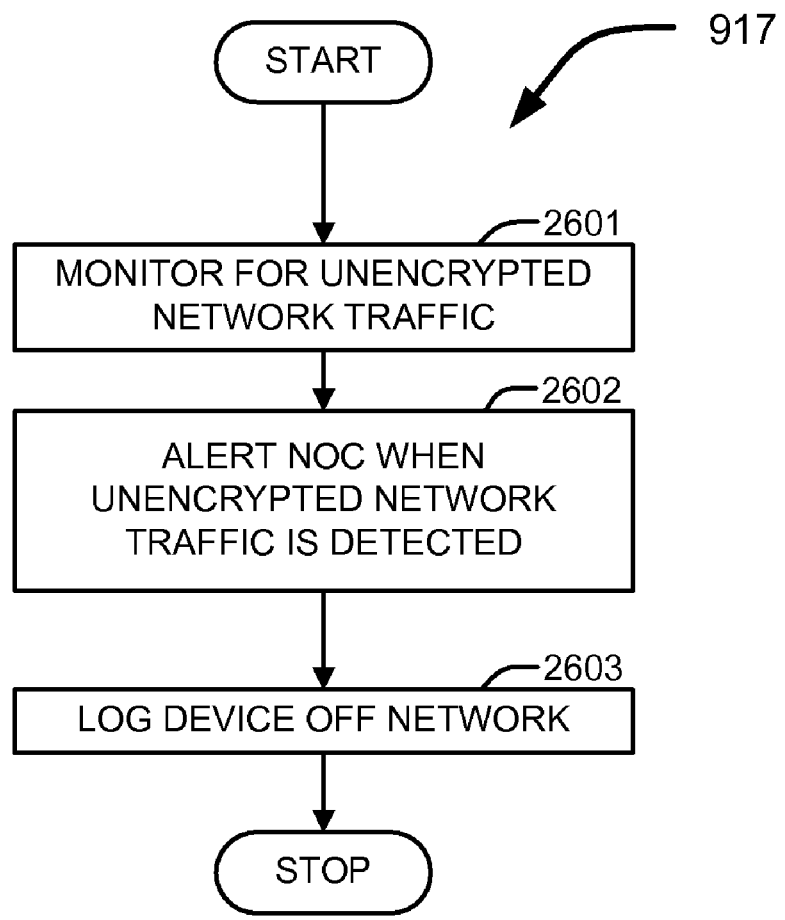
FIG. 26 shows a flow chart illustrating the process of monitoring and providing countermeasures against unencrypted traffic for the wireless system of FIG. 1.

FIG. 26 shows a flow chart 917 illustrating the process of monitoring and providing countermeasures against unencrypted traffic for the wireless system of FIG. 1. In this process the Wireless Network 110 is monitored for unencrypted traffic in step 2601.

In step 2602, NOC 360 is alerted when unencrypted traffic is detected.

In step 2603, the device transmitting the unencrypted traffic is logged off of the network.

Figure 27:
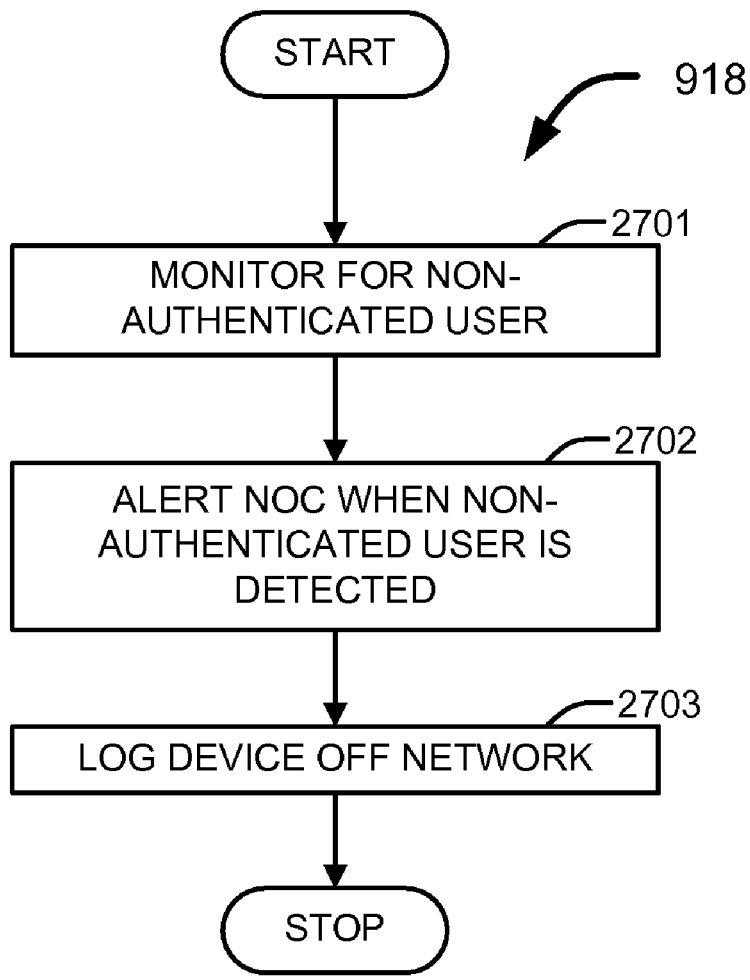
FIG. 27 shows a flow chart illustrating the process of monitoring and providing countermeasures against non-authenticated devices on the wireless network for the wireless system of FIG. 1.

FIG. 27 shows a flow chart 918 illustrating the process of monitoring and providing countermeasures against non-authenticated devices on the Wireless Network 110 for the wireless system of FIG. 1. In this process non-authorized devices are monitored for in step 2701.

In step 2702, NOC 360 is alerted when a non-authenticated device is found coupled to the Wireless network 110.

In step 2703, the non-authenticated device is logged off of the network.

Although the present invention has been described in considerable detail with reference to exemplary embodiments, modifications and variations may be made to the disclosed embodiments while remaining within the subject and spirit of the invention. Therefore, the spirit and scope of the appended claims should not be limited to the description of the versions contained herein.

What is claimed is:

1. A method for managing a secure local area network wherein the local area network includes a plurality of private networks logically linked to a wireless network having a plurality of wireless access points for isolating data traffic, the method comprising:

authenticating a plurality of wireless user devices to be coupled to the wireless network;

segregating the plurality of authenticated wireless user devices into a first logical wireless virtual local area network of the wireless network and a second logical wireless virtual local area network of the wireless network;

assigning at least one wireless access point of the plurality of wireless access points to at least one authenticated wireless user device of the authenticated plurality of wireless user devices based upon the proximity of the plurality of wireless access points to the plurality of wireless user devices;

coupling the authenticated plurality of wireless user devices to the wireless network through the assigned at least one wireless access point of the plurality of wireless access points;

dynamically reassigning at least a second wireless access point of the plurality of wireless access points to the at least one authenticated wireless user device based upon the proximity of the plurality of wireless access points to the plurality of wireless user devices, wherein the dynamically reassigning of at least a second wireless access point is performed as the at least one authenticated wireless user device is repositioned;

dynamically coupling the authenticated plurality of wireless user devices to the wireless network through at least the second wireless access point wherein the dynamically coupling of the authenticated plurality of wireless user devices is performed as the plurality of authenticated wireless user devices are repositioned, thereby permitting the plurality of authenticated user devices to roam seamlessly throughout the wireless network;

segregating the plurality of private networks into a corresponding plurality of logical private virtual local area networks of the local area network; and linking the first and second logical wireless virtual local area network to at least one of the plurality of logical private virtual local area networks, thereby enabling the plurality of authenticated wireless user devices to couple to at least one of the plurality of private networks, wherein traffic between the first logical wireless virtual local area network and the at least one linked private virtual local area network is isolated from traffic between the second logical wireless virtual local area network and the at least one linked private virtual local area network.

2. The method, as recited in claim 1, wherein the linking of the first and second logical wireless virtual local area network to the plurality of logical virtual local area networks is dictated by set policies, and wherein the policies are configurable.

3. The method, as recited in claim 2, wherein the plurality of private networks are coupled to the local area network through a plurality of access ports, and wherein each access port couples to one private network.

4. The method, as recited in claim 3, wherein traffic from the plurality of private networks through the plurality of access ports is tagged by at least one building router for identification.

5. The method, as recited in claim 2, wherein the plurality of private networks are coupled to the local area network through a plurality of wireless-to-Ethernet bridges, wherein the plurality of wireless-to-Ethernet bridges couple wirelessly to the plurality of access points and wherein each wireless-to-Ethernet bridge couples to one private network.

6. The method, as recited in claim 1, wherein the plurality of access points are distributed in a cell-like fashion, and wherein radio frequency mapping is used to determine the placement of the plurality of access points.

7. The method, as recited in claim 1, wherein the authenticating the plurality of wireless user devices is performed against a wireless local area network switch including wireless user device credentials, a local database including wireless user device credentials and a roamer database including wireless user device credentials, thereby allowing for extensive authenticated wireless user device mobility and authenticated wireless user device roaming capability.

8. The method, as recited in claim 1, further wherein a plurality of devices are all wirelessly transmitting devices located in a coverage area of the wireless network.

9. The method, as recited in claim 8, wherein radio frequency interference is decreased by reducing superfluous devices within the coverage area of the wireless network, wherein the superfluous devices do not serve a legitimate function in the wireless network and wherein the plurality of devices includes superfluous devices.

10. The method, as recited in claim 7, wherein the wireless network includes at least two wireless networks enabling extensive roaming by user devices.

11. A method for managing the secure local area network wherein the local area network includes a plurality of private networks logically linked to a wireless network having a plurality of wireless access points for isolating data traffic, the method comprising:
- authenticating the plurality of wireless user devices to be coupled to the wireless network;
- segregating the plurality of authenticated wireless user devices into a first logical wireless virtual local area network of the wireless network and a second logical wireless virtual local area network of the wireless network;
- coupling the authenticated plurality of wireless user devices to the wireless network, wherein the coupling is performed through at least one wireless access point of the plurality of wireless access points and wherein the at least one wireless access point is dynamically designated by the user device location;
- coupling the plurality of private networks to the local area network through a plurality of access ports, wherein each access port couples to one private network;
- segregating the plurality of private networks into a corresponding plurality of logical private virtual local area networks of the local area network; and
- linking the first and second logical wireless virtual local area network to at least one of the plurality of logical private virtual local area networks, thereby enabling the plurality of authenticated wireless user devices to couple to at least one of the plurality of private networks, wherein traffic between the first logical wireless virtual local area network and at least one linked private virtual local area network is isolated from traffic between the second logical wireless virtual local area network and the at least one linked private virtual local area network.

12. The method, as recited in claim 11, wherein the linking of the first and second logical wireless virtual local area network to the plurality of logical virtual local area networks is dictated by set policies, and wherein the policies are configurable.

13. The method, as recited in claim 11, wherein the authenticating the plurality of wireless user devices is performed against a wireless local area network switch including wireless user device credentials, a local database including wireless user device credentials and a roamer database including wireless user device credentials, thereby allowing for extensive authenticated wireless user device mobility and authenticated wireless user device roaming capability.

14. The method, as recited in claim 11, wherein radio frequency interference is decreased by reducing wirelessly transmitting devices within the wireless network.

15. The method, as recited in claim 11, wherein the wireless network includes at least two wireless networks enabling extensive roaming by user devices.

16. A secure and segregated local area network useful in association with a multi user group environment, the local area network comprising:
- a wireless local area network switch configured to a plurality of wireless user devices, segregating the plurality of authenticated wireless user devices into a first logical wireless virtual local area network of a wireless network and a second logical wireless virtual local area network of the wireless network, segregating a plurality of private networks into a corresponding plurality of logical private virtual local area networks of the local area network, and linking the first and second logical wireless virtual local area network to at least one of the plurality of logical private virtual local area networks;
- a plurality of access points configured to couple the authenticated plurality of wireless user devices to the wireless network, wherein the coupling is performed through at least one wireless access point of the plurality of wireless access points and wherein the at least one wireless access point is dynamically designated by the user device location; and
- a plurality of access ports configured to couple the plurality of private networks to the local area network through the plurality of access ports, wherein each access port couples to one private network.

17. The secure local area network of claim 16, wherein the plurality of access points are distributed in a cell-like fashion, and wherein radio frequency mapping is used to determine the placement of the plurality of access points.

18. The secure local area network of claim 16, wherein the wireless local area network switch for authenticating the plurality of wireless user devices utilizes at least one remote authentication dial in user service server.

19. The secure local area network of claim 18, wherein the plurality of access ports are a plurality of wireless-to-Ethernet bridges, wherein the plurality of wireless-to-Ethernet bridges couple wirelessly to the plurality of access points and wherein each wireless-to-Ethernet bridge couples to one private network.

20. The secure local area network of claim 16, wherein at least one router couples the at least two wireless networks together.

* * * * *